(12) United States Patent
Lin et al.

(10) Patent No.: US 12,050,745 B2
(45) Date of Patent: Jul. 30, 2024

(54) CONTROL METHOD FOR CONTROLLER OF INTERFACE DEVICE WITH MULTIPLE SENSING FUNCTIONS

(71) Applicant: NOVATEK Microelectronics Corp., Hsinchu (TW)

(72) Inventors: Yi-Ying Lin, Hualien County (TW); Chih-Chang Lai, Taichung (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/341,776

(22) Filed: Jun. 27, 2023

(65) Prior Publication Data

US 2024/0028151 A1    Jan. 25, 2024

Related U.S. Application Data

(63) Continuation-in-part of application No. 17/813,608, filed on Jul. 20, 2022, now Pat. No. 11,726,610.

(51) Int. Cl.
  G06F 3/041    (2006.01)
  G06F 3/044    (2006.01)
(52) U.S. Cl.
  CPC .......... G06F 3/0416 (2013.01); G06F 3/0446 (2019.05)
(58) Field of Classification Search
  None
  See application file for complete search history.

(56) References Cited

U.S. PATENT DOCUMENTS

| 10,394,368 | B2 | 8/2019 | Tang et al. | |
| 2012/0169660 | A1* | 7/2012 | Seo | G06F 3/0446 |
| | | | | 345/174 |
| 2015/0091859 | A1* | 4/2015 | Rosenberg | G06F 3/0446 |
| | | | | 345/174 |
| 2015/0277624 | A1* | 10/2015 | Yeh | G06F 3/0443 |
| | | | | 345/174 |
| 2016/0202785 | A1* | 7/2016 | Bell | G06F 3/0446 |
| | | | | 345/173 |
| 2016/0266676 | A1* | 9/2016 | Wang | G06F 3/041662 |
| 2018/0059866 | A1* | 3/2018 | Drake | G06F 3/0446 |
| 2019/0272059 | A1* | 9/2019 | Heim | G06F 3/017 |
| 2020/0019279 | A1* | 1/2020 | Xie | G06F 3/0441 |

(Continued)

FOREIGN PATENT DOCUMENTS

| EP | 2966555 B1 | 5/2021 |
| TW | 201109978 A | 3/2011 |

(Continued)

*Primary Examiner* — Duane N Taylor, Jr.
(74) *Attorney, Agent, or Firm* — CKC & Partners Co., LLC

(57) ABSTRACT

A control method, suitable for a controller in an interface device having capacitive sensors, includes following steps. The capacitive sensors are arranged on a plane. During a first period, the controller is configured to set the capacitive sensors as self-capacitance sensors individually. During a second period, the controller is configured to divide the capacitive sensors into at least a first group and a second group, set the first group of capacitive sensors as a mutual-capacitance transmitter and generate a pulse signal to the mutual-capacitance transmitter, set the second group of capacitive sensors as a mutual-capacitance receiver and collect a sensing signal from the mutual-capacitance receiver in response to the pulse signal.

18 Claims, 25 Drawing Sheets

(56) References Cited

U.S. PATENT DOCUMENTS

2020/0343325 A1* 10/2020 Cai .................. H10K 59/65
2021/0318779 A1* 10/2021 Ko .................. G06F 3/0448
2021/0373736 A1   12/2021 Chen et al.

FOREIGN PATENT DOCUMENTS

| TW | 201614436 A | 4/2016 |
| TW | 201823956 A | 7/2018 |

* cited by examiner

CONTROL METHOD FOR CONTROLLER OF INTERFACE DEVICE WITH MULTIPLE SENSING FUNCTIONS

CROSS-REFERENCE TO RELATED APPLICATION

The present application is a continuation in part of U.S. application Ser. No. 17/813,608, filed on Jul. 20, 2022, which is herein incorporated by reference.

BACKGROUND

Field of Invention

The disclosure relates to a control method for a controller with multiple sensing functions. More particularly, the disclosure relates to a control method for a controller capable of sensing a touch event, a proximity event or a three-dimensional gesture event on an interface device.

Description of Related Art

On a mobile device, there are various sensors to detect different environmental conditions or events. For example, the mobile device may include touch sensors for detecting a touched position on a sensing surface, an optical proximity sensor for detecting a distance between the mobile device and an object in front of the mobile device, an optical gesture capturing module for sensing a hand gesture performed by a user.

Aforesaid different sensing functions are usually performed by different hardware components disposed on the mobile device. These hardware components may occupy a certain area on the mobile device. For example, the touch sensors, the optical proximity sensor and the optical gesture capturing module may be disposed separately on a front surface of the mobile device. It will occupy more area on the front surface of the mobile device to accommodate all these different sensors.

SUMMARY

An embodiment of the disclosure provides a control method for a controller in an interface device. The interface device has capacitive sensors arranged on a plane. During a first period, the controller is configured to set the capacitive sensors as self-capacitance sensors individually. During a second period, the controller is configured to divide the capacitive sensors into at least a first group and a second group, set the first group of capacitive sensors as a mutual-capacitance transmitter and generate a pulse signal to the mutual-capacitance transmitter, set the second group of capacitive sensors as a mutual-capacitance receiver and collect a sensing input signal from the mutual-capacitance receiver in response to the pulse signal.

An embodiment of the disclosure provides a control method for a controller in an interface device. The interface device has capacitive sensors arranged on a plane. During a first period, the controller is configured to set the capacitive sensors as self-capacitance sensors individually. During a second period, the controller is configured to divide the capacitive sensors into groups, set a first combination of the groups of capacitive sensors as a mutual-capacitance transmitter and generate a pulse signal to the mutual-capacitance transmitter, set a second combination of the groups of capacitive sensors as mutual-capacitance receivers and collect sensing signals from the mutual-capacitance receivers in response to the pulse signal, and detect a three-dimensional gesture according to the sensing signals.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
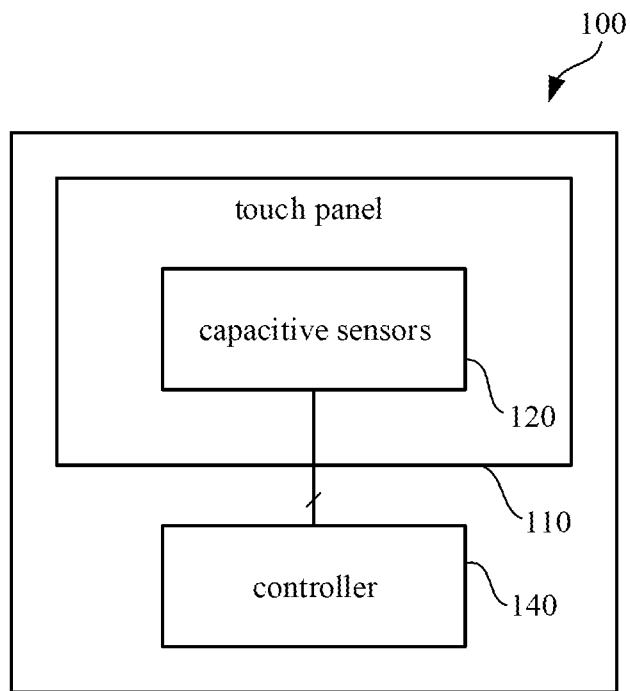
FIG. 1 is a schematic diagram illustrating an interface device according to some embodiments of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an interface device 100 according to some embodiments of this disclosure. In practical applications, the interface device 100 can be a touch displayer, a touch pad, a smartphone, a tablet computer or an electronic apparatus with a touch sensing function. As shown in FIG. 1, the interface device 100 includes capacitive sensors 120 and a controller 140 electrically connected with the capacitive sensors 120.

In some embodiments, the capacitive sensors 120 are arranged on a plane of a touch panel 110. The capacitive sensors 120 are configured to sense capacitance variances on the touch panel 110. The controller 140 is electrically connected to each of the capacitive sensors 120.

Figure 2:
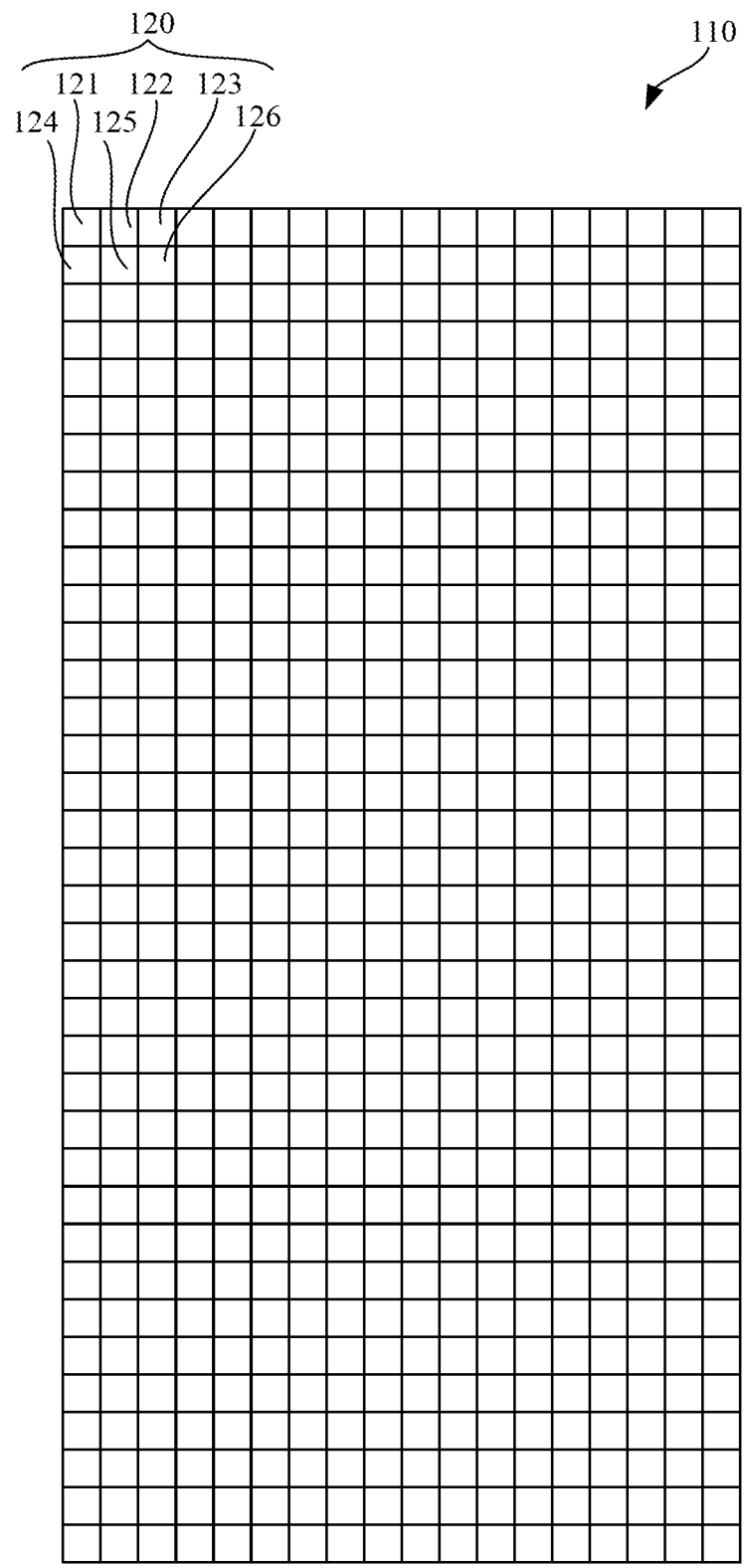
FIG. 2 is a schematic diagram illustrating the capacitive sensors arranged on the touch panel according to an embodiment of this disclosure.

Reference is further made to FIG. 2, which is a schematic diagram illustrating the capacitive sensors 120 arranged on the touch panel 110 according to an embodiment of this disclosure. As the embodiment shown in FIG. 2, there are total 648 (18*36) capacitive sensors 120 arranged on 18 columns and 36 rows on the plane of the touch panel 110. For examples, the capacitive sensors 120 include capacitive sensors 121-126. The capacitive sensors 121, 122 and 123 are arranged on the first row on the touch panel 110; and the capacitive sensors 124, 125 and 126 are arranged on the second row on the touch panel 110.

It is noticed that, the embodiment shown in FIG. 2 is illustrated for demonstration. However, this disclosure is not limited to a specific amount of capacitive sensors. For example, the interface device 100 can include 10*10 capacitive sensors, 30*20 capacitive sensors, 30*40 capacitive sensors, 360*240 capacitive sensors or any similar arrangement. The amount of the capacitive sensors can be modified according to a resolution requirement of the interface device 100.

As shown in FIG. 1, the controller 140 is coupled with each of the capacitive sensors 120. The controller 140 is configured to control the capacitive sensors 120 (e.g., providing pulse signals to the capacitive sensors 120, collecting results from the capacitive sensors 120), so as to detect various events (e.g., a touch event, a proximity event or a three-dimensional gesture event) based on the capacitance variances. In some embodiments, the controller 140 can be implemented by various circuitry structures to provide pulse signals to the capacitive sensors 120 and/or sensing results from the capacitive sensors 120. For example, US published application, US2021/0373736 A1, has taught that the pulse signals for driving the transmitting electrodes can be generated by an operational amplifier. In addition, US published application, US2021/0373736A1, has taught that the sensing signals can be detected by the touch sensing circuit. The touch sensing circuit may include a buffer and a group of switches. Aforesaid US published application, US2021/0373736A1, is incorporated by reference herein.

Figure 3A:
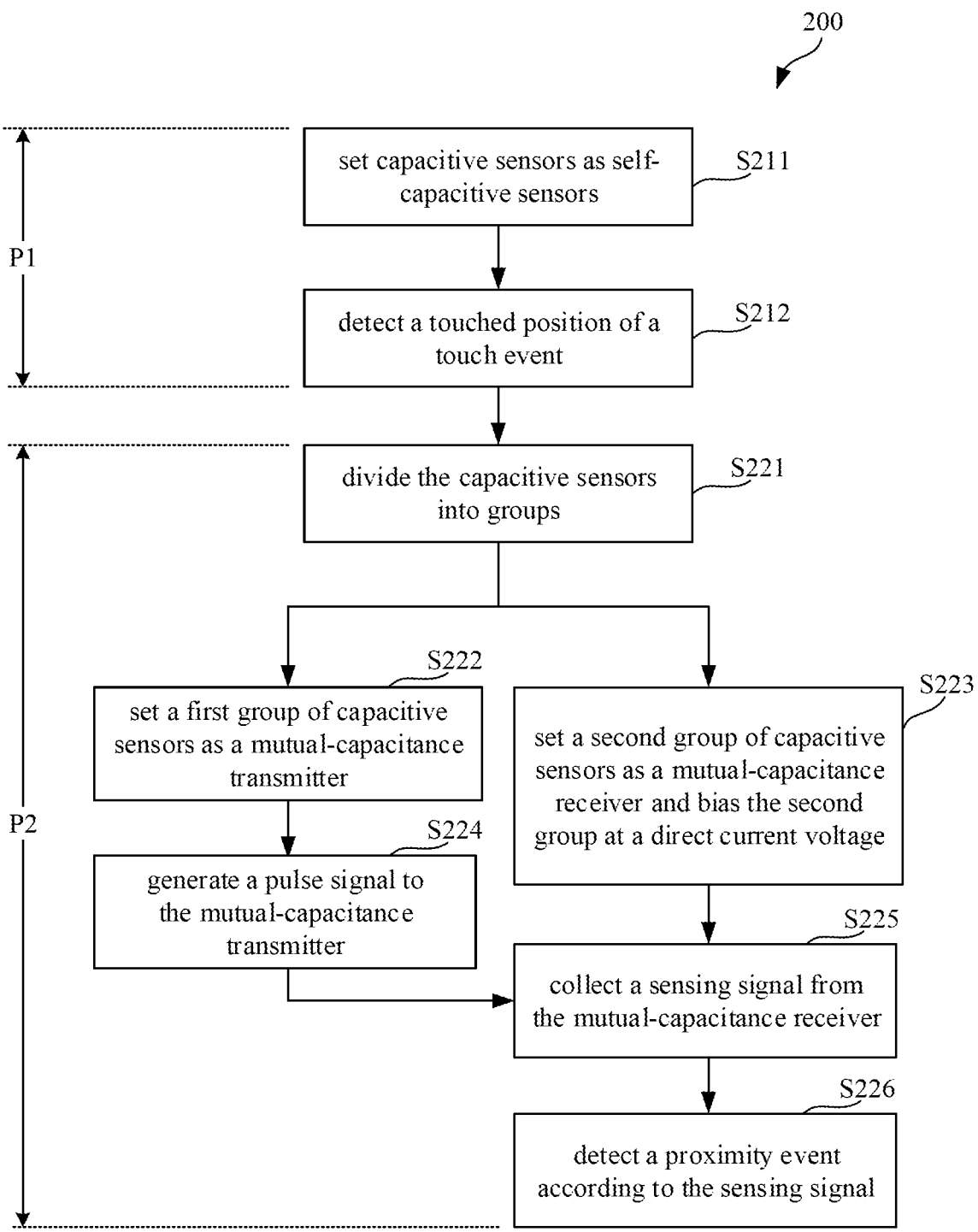
FIG. 3A is a flow chart illustrating a control method according to some embodiments of the disclosure.
Figure 3B:
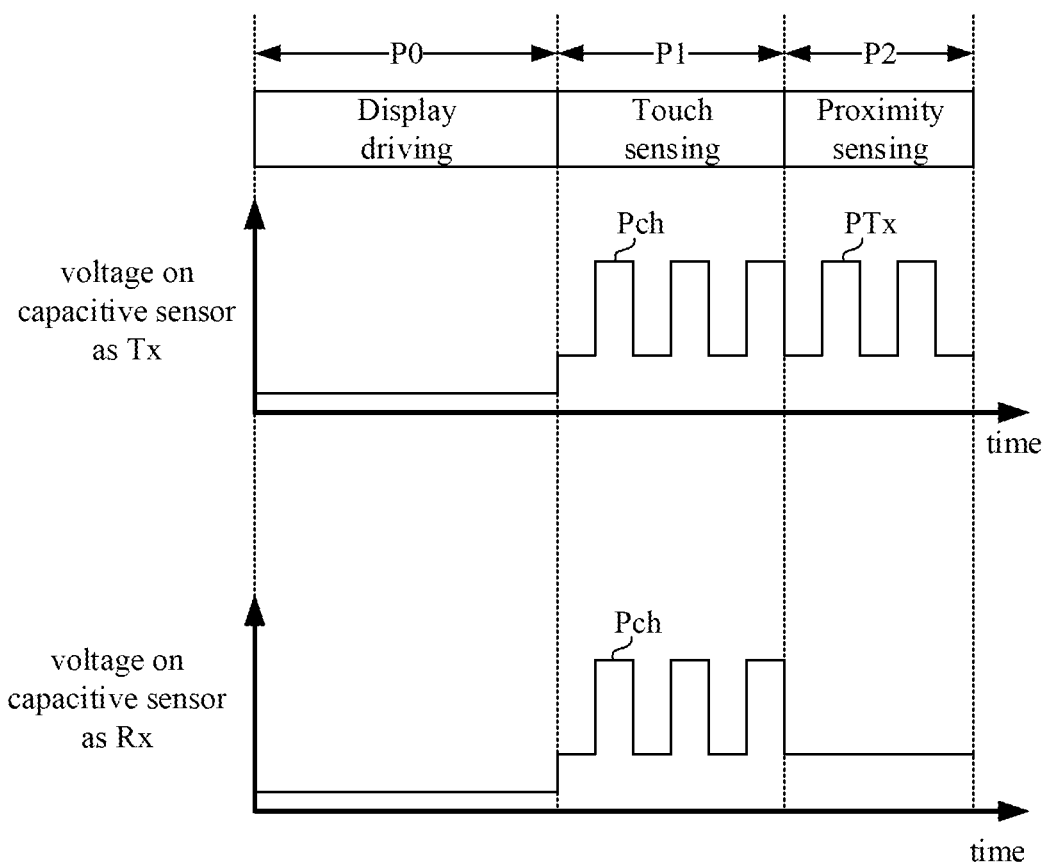
FIG. 3B is a time diagram illustrating signals provided by the controller to the capacitive sensors over time in different periods according to some embodiments.

In some embodiments, the controller 140 is capable to detect information about a touch event and a proximity event based on capacitance variances sensed by the capacitive sensors 120. Reference is further made to FIG. 3A and FIG. 3B. FIG. 3A is a flow chart illustrating a control method 200 according to some embodiments of the disclosure. FIG. 3B is a time diagram illustrating signals provided by the controller 140 to the capacitive sensors 120 over time in different periods according to some embodiments. In some embodiments, the control method 200 shown in FIG. 3A is suitable to be executed by the controller 140 in the interface device 100 as shown in FIG. 1.

As shown in FIG. 3B, there are three different periods P0, P1 and P2. During a display driving period P0, the interface device 100 may generate some display-related signals (e.g., scan signals, data signals or polarity signals, not shown in figures) to a displayer (not shown in figures) of the interface device 100. During the display driving period P0, the controller 140 may disable the capacitive sensors 120 (by not applying any driving signals to the capacitive sensors 120). In this case, the signals on the capacitive sensors 120 will not interfere with the display-related signals utilized by the displayer.

FIG. 3A illustrates steps of the control method 200 executed by the controller 140 in the interface device 100 corresponding to periods P1 and P2.

Figure 4:
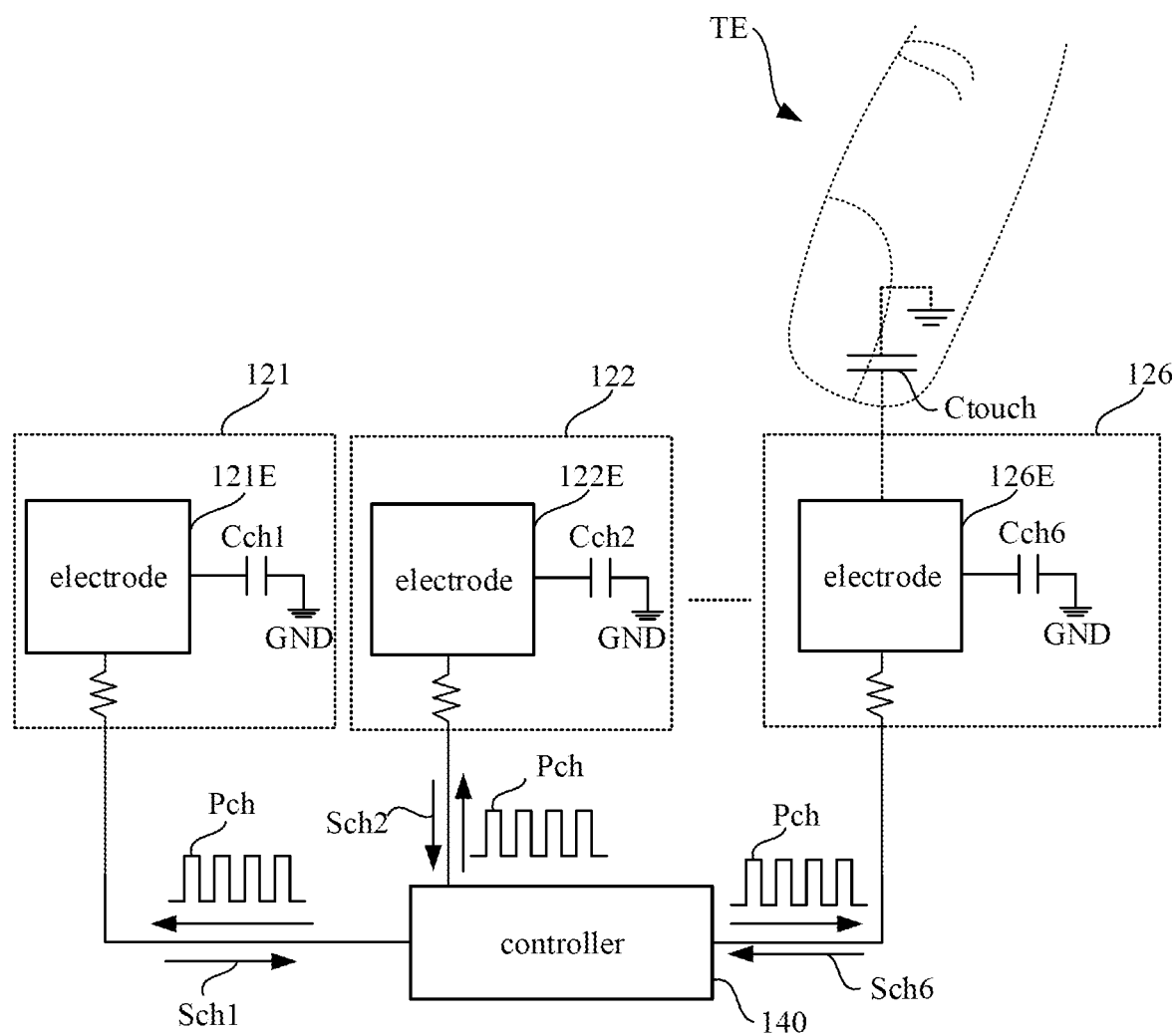
FIG. 4 is a schematic diagram illustrating the capacitive sensors in FIG. 2 utilized as self-capacitance sensors during the touch sensing period.

As shown in FIG. 3A and FIG. 3B, during a touch sensing period P1, step S211 is executed by the controller 140 to set the capacitive sensors 120 individually as self-capacitance sensors. Reference is further made to FIG. 4, which is a schematic diagram illustrating the capacitive sensors 121-126 in FIG. 2 utilized as self-capacitance sensors during the touch sensing period P1.

As shown in FIG. 4, each of the capacitive sensors 120 includes an electrode and a capacitor induced by the electrode. For example, the capacitive sensor 121 includes an electrode 121E, and a capacitor Cch1 will be induced between the electrode 121E and a ground terminal GND. Similarly, the capacitive sensor 122 includes an electrode 122E, and a capacitor Cch2 will be induced between the electrode 122E and a ground terminal GND. Similarly, the capacitive sensor 126 also includes an electrode 126E, and a capacitor Cch6 will be induced between the electrode 126E and a ground terminal GND. For example, the ground terminal GND can be a substrate or a ground plate of the touch panel 110. As shown in FIG. 3B and FIG. 4, during the touch sensing period P1, the controller 140 is configured to provide a pulse signal Pch to each of the capacitive sensors 120.

During the touch sensing period P1, the capacitive sensor 121 is set as the self-capacitance sensor. The controller 140 is configured to provide the pulse signal Pch to the capacitive sensor 121, and collect a result signal Sch1 (e.g., induced currents) from the capacitive sensor 121 in response to the pulse signal Pch. Based on the result signal Sch1, the controller 140 is able to calculate a capacitance reading relative to the capacitive sensor 121. As shown in FIG. 4, when there is no touch event occurring to the capacitive sensor 121, the capacitance reading relative to the capacitive sensor 121 will be steady and similar to an original capacitance reading of the capacitor Cch1.

Similarly, the controller 140 is configured to provide the pulse signal Pch to the capacitive sensor 122, and collect a result signal Sch2 (e.g., induced currents) from the capacitive sensor 122 in response to the pulse signal Pch. Based on the result signal Sch2, the controller 140 is able to calculate a capacitance reading relative to the capacitive sensor 122. In this case, when there is no touch event occurring to the capacitive sensor 122, the capacitance reading relative to the capacitive sensor 122 will be steady and similar to an original capacitance reading of the capacitor Cch2.

As shown in FIG. 4, it is assumed that a touch event TE occurs on the capacitive sensor 126 (e.g., a finger touches on a surface above the capacitive sensor 126). In this case, the touch event TE will induce another capacitor Ctouch, and the induced capacitor Ctouch will be coupled to the electrode 126E of the capacitive sensor 126. During the touch sensing period P1, the controller 140 is configured to provide the pulse signal Pch to the capacitive sensor 126, and collect a result signal Sch6 (e.g., induced currents) from the capacitive sensor 126 in response to the pulse signal Pch. Based on the result signal Sch6, the controller 140 is able to calculate a capacitance reading relative to the capacitive sensor 126.

In this case, the capacitor Ctouch is induced by the touch event TE and coupled to the electrode 126E of the capacitive sensor 126. In this case, when the touch event TE occurs on the capacitive sensor 126, the capacitance reading relative to the capacitive sensor 126 will be increased and be larger than an original capacitance reading of the capacitor Cch6. In this case, step S212 is executed by the controller 140 to detect the touch event TE and recognize an existence of the touch event (e.g., whether there is a touch on the touch panel 110 or not) and a touched position of the touch event TE (e.g., above the capacitive sensor 126 shown in FIG. 4 in the example) according to the result signals from each one of the self-capacitance sensors. During the touch sensing period P1, each of the capacitive sensors 120 generate a result signal on its own to reflect the touch sensing outcome, such that a sensible resolution of the touch sensing function is relatively higher (equal to a total amount of the capacitive sensors 120, e.g., 18*36 in aforesaid embodiment).

In aforesaid embodiments, during the touch sensing period P1, each of the capacitive sensors 120 is utilized separately and individually as one self-capacitance sensor, to detect the touch event TE at different positions.

Figure 5:
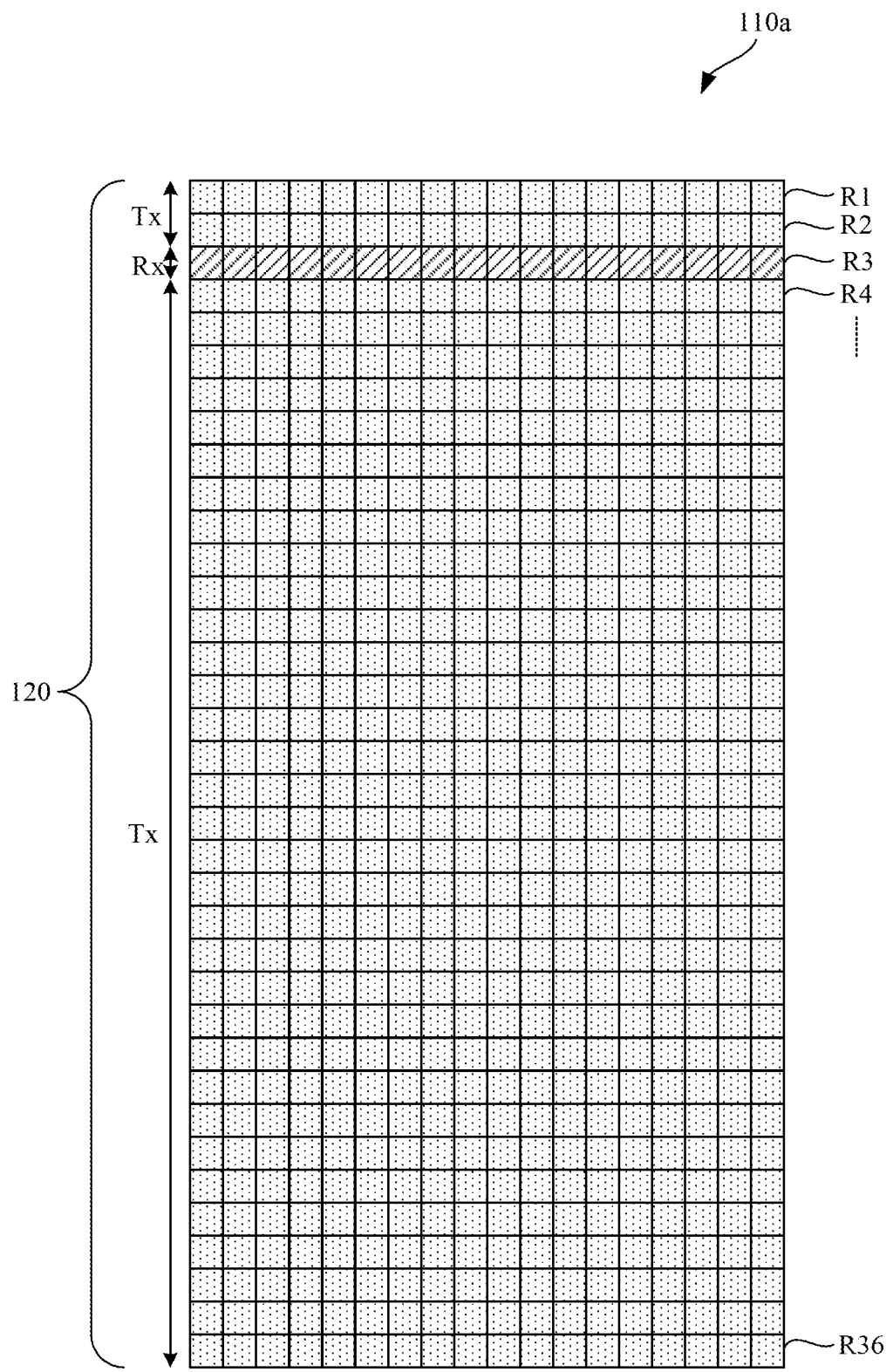
FIG. 5 is a schematic diagram illustrating the capacitive sensors on a touch panel with a first grouping layout during a proximity sensing period according to an embodiment of this disclosure.

Reference is further made to FIG. 5, which is a schematic diagram illustrating the capacitive sensors 120 on a touch panel 110a with a first grouping layout during a proximity sensing period according to an embodiment of this disclosure.

During a proximity sensing period P2, in some embodiments, step S221 is executed by the controller 140 to divide the capacitive sensors 120 into at least a first group and a second group. As the touch panel 110a with the first grouping layout shown in FIG. 5, the capacitive sensors 120 located on rows R1-R2 and row R4-R36 are divided into the first group, and the capacitive sensors 120 located on a row R3 are divided into the second group. In this example, during the proximity sensing period P2, step S222 is executed, and the controller 140 is configured to set the first group of capacitive sensors 120 (on the rows R1-R2 and R4-R36) as a mutual-capacitance transmitter Tx. On the other hand, step S223 is executed, and the controller 140 is configured to set the second group of capacitive sensors 120 (on the row R3) as a mutual-capacitance receiver Rx, and bias the second group of capacitive sensors 120 (on the row R3) at a direct current voltage.

Figure 6:
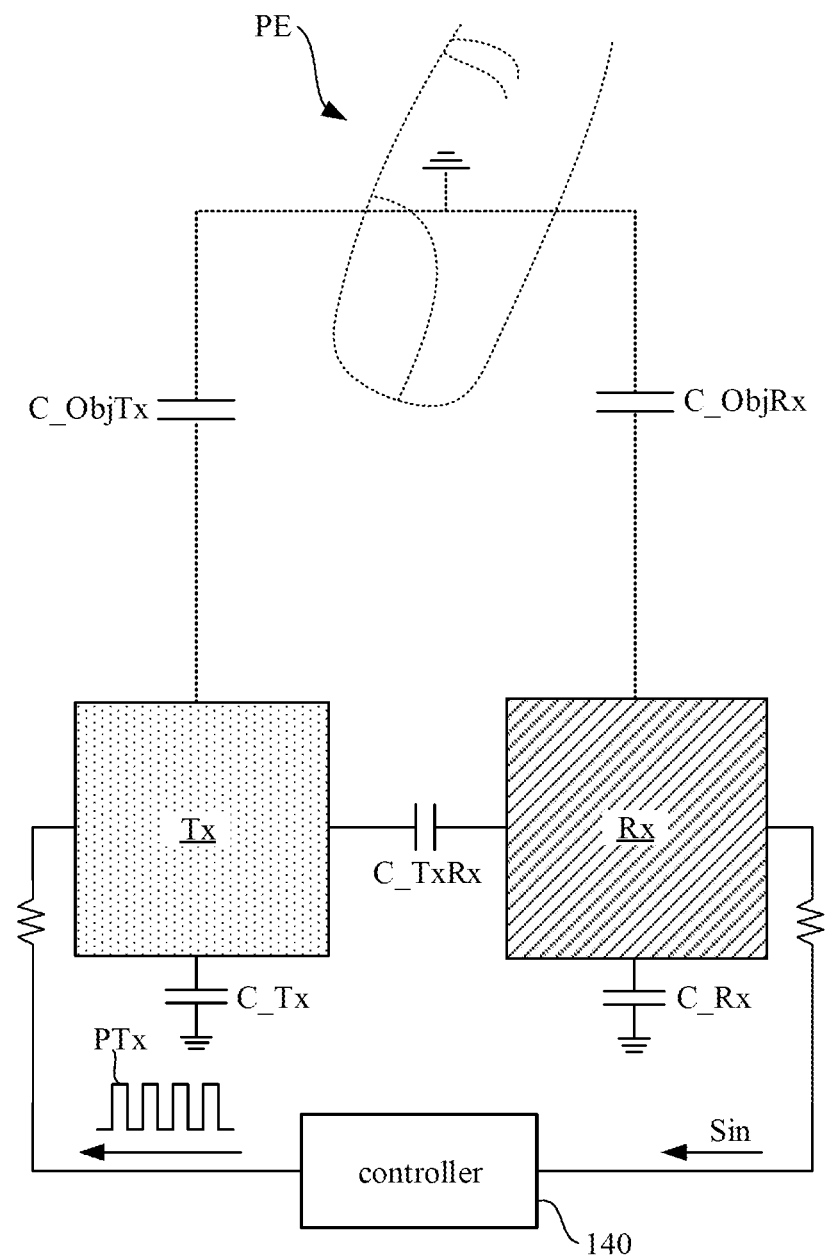
FIG. 6 is a schematic diagram illustrating a circuit structure formed by the mutual-capacitance transmitter and the mutual-capacitance receiver during the proximity sensing period.

Reference is further made to FIG. 6, which is a schematic diagram illustrating a circuit structure formed by the mutual-capacitance transmitter Tx and the mutual-capacitance receiver Rx during the proximity sensing period P2.

It is noticed that, the mutual-capacitance transmitter Tx shown in FIG. 6 includes the capacitive sensors 120 located on rows R1-R2 and row R4-R36 in the first group shown in FIG. 5, such that the mutual-capacitance transmitter Tx equivalently includes a large-sized transmitting electrode (by integrating electrodes of those 18*35 capacitive sensors 120 in the first group). Similarly, the mutual-capacitance receiver Rx shown in FIG. 6 includes the capacitive sensors 120 located on rows R3 in the second group shown in FIG. 5, such that the mutual-capacitance receiver Rx equivalently includes a large-sized receiving electrode (by integrating those 18 electrodes of the capacitive sensors 120 in the second group).

As shown in FIG. 6, a capacitor C_Tx will be induced between the mutual-capacitance transmitter Tx (formed by integrating the electrodes in the first group) and the ground terminal GND. For example, the ground terminal GND can be a substrate or a ground plate of the touch panel 110. A capacitor C_Rx will be induced between the mutual-capacitance receiver Rx (formed by integrating the electrodes in the second group) and the ground terminal GND. A capacitor C_TxRx will be induced between the mutual-capacitance transmitter Tx and the mutual-capacitance receiver Rx.

As shown in FIG. 3A, FIG. 3B and FIG. 6, during the proximity sensing period P2, step S224 is executed by the controller 140 for providing a pulse signal PTx to the mutual-capacitance transmitter Tx. In other words, the pulse signal PTx is provided synchronously to all of the capacitive sensors 120 in the first group (as the mutual-capacitance transmitter Tx), such that all of the capacitive sensors 120 in the first group operates as one mutual-capacitance transmitter Tx together.

As shown in FIG. 3B and FIG. 6, during the proximity sensing period P2, the controller 140 is configured to set all of the capacitive sensors in the second group as the mutual-capacitance receiver Rx. In some embodiments, during the proximity sensing period P2 as shown in FIG. 3B, the second group of capacitive sensors 120 are biased at a direct current voltage by the controller. In some embodiments, the mutual-capacitance receiver Rx is configured at a floating voltage level during the proximity sensing period P2. As shown in FIG. 3A, FIG. 3B and FIG. 6, during the proximity sensing period P2, step S225 is executed by the controller 140 to collect a sensing signal Sin from the mutual-capacitance receiver Rx in response to the pulse signal PTx. In some embodiments, when the pulse signal PTx is applied to the mutual-capacitance transmitter Tx, the pulse signal PTx will induce a corresponding current onto the mutual-capacitance receiver Rx (via the capacitor C_TxRx coupled in-between), the induced current can be collected as the sensing signal Sin from the mutual-capacitance receiver Rx to the controller 140.

In some embodiments, step S226 is executed by the controller 140 to detect a proximity event PE according to the sensing signal Sin generated by the mutual-capacitance receiver Rx during the proximity sensing period P2. If there is no proximity event PE, there is only the capacitor C_TxRx coupled between the mutual-capacitance transmitter Tx and the mutual-capacitance receiver Rx, and the pulse signal PTx applied on the mutual-capacitance transmitter Tx will couple through the capacitor C_TxRx onto the mutual-capacitance receiver Rx to induce the sensing signal Sin. Based on the sensing signal Sin, the controller 140 is able to calculate a capacitance reading relative to the mutual-capacitance transmitter Tx and the mutual-capacitance receiver Rx. When there is no proximity event occurring to the mutual-capacitance transceiver (Tx and Rx), the capacitance reading will be steady.

On the other hand, if there is a proximity event PE (e.g., user's finger, palm or cheek hovering above the touch panel) as shown in FIG. 6, the proximity event PE will induce a capacitor C_ObjTx between a proximity object and the mutual-capacitance transmitter Tx and another capacitor C_ObjRx between the proximity object and the mutual-capacitance receiver Rx. When the pulse signal PTx is applied on the mutual-capacitance transmitter Tx, a partial portion of the pulse signal PTx will couple through the capacitor C_ObjTx to the ground. In this case, the proximity event PE will reduce a current flow of the sensing signal Sin. In some embodiments, the capacitors C_ObjTx and C_ObjRx are induced by the proximity event PE and coupled to the mutual-capacitance transceiver (Tx and Rx). In this case, when the proximity event PE occurs, the capacitance reading relative to the mutual-capacitance transceiver (Tx and Rx) will be decreased and be lower than an original capacitance reading (as there is no proximity event PE). By monitoring a variation of the capacitance reading, the controller 140 is able to detect the proximity event PE.

Figure 7A:
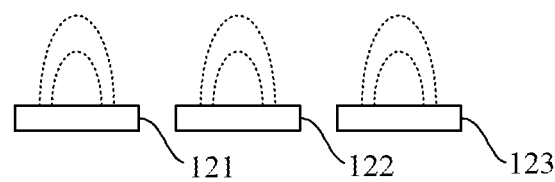
FIG. 7A is a schematic diagram illustrating a distribution of line of electric force when the capacitive sensors are utilized as self-capacitance sensors individually during the touch sensing period.
Figure 7B:
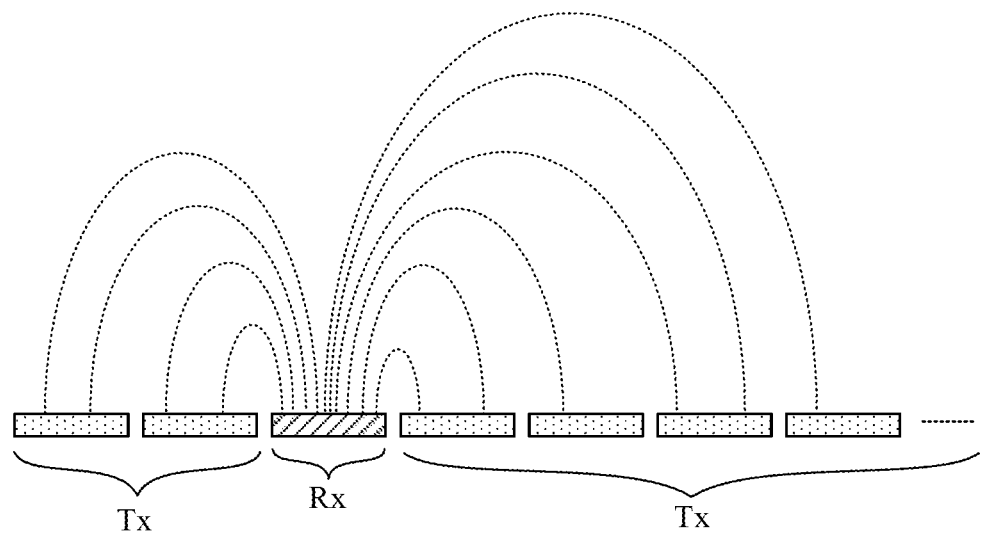
FIG. 7B is a schematic diagram illustrating a distribution of line of electric force when the capacitive sensors are integrated as the mutual-capacitance transmitter or the mutual-capacitance receiver during the proximity sensing period.

Reference is further made to FIG. 7A and FIG. 7B. FIG. 7A is a schematic diagram illustrating a distribution of line of electric force when the capacitive sensors 121-123 are utilized as self-capacitance sensors individually during the touch sensing period P1. FIG. 7B is a schematic diagram illustrating a distribution of line of electric force when the capacitive sensors 120 are integrated as the mutual-capacitance transmitter Tx or the mutual-capacitance receiver Rx during the proximity sensing period P2.

As shown in FIG. 7A, because a size of the electrode in the capacitive sensors 121-123 is limited, the line of electric force will cover a relatively small range above the capacitive sensors 121-123. In this case, the touch event TE can only be sensed by the capacitive sensors 121-123 when the touch event TE is located closely on a surface of the capacitive sensors 121-123. The interface device 100 during the touch sensing period P1 can provide a higher resolution of the touched position, but it cannot sense a hovering finger above the capacitive sensors 121-123.

As shown in FIG. 7B, the line of electric force will cover a relatively large range above the mutual-capacitance transmitter Tx and the mutual-capacitance receiver Rx. In this case, the proximity event PE can be sensed in a larger range above a surface of the capacitive sensors 120. The interface device 100 during the proximity sensing period P2 is capable of sensing a hovering finger above the capacitive sensors 120. In this case, the interface device 100 is able to sense the proximity event PE (for determining whether the mutual-capacitance receiver Rx is close to an external object or not) during the proximity sensing period P2.

In the embodiment shown in FIG. 5, the capacitive sensors 120 are arranged in rows and columns on the plane of the touch panel 110*a*. On the touch panel 110*a* with the first grouping layout, the capacitive sensors 120 in the second group (as the mutual-capacitance receiver Rx) are arranged on a stripe region on the plane of the touch panel. According to the grouping layout of the touch panel 110*a*, the stripe region includes the row R3 on the touch panel 110*a*. The capacitive sensors 120 in the first group (as the mutual-capacitance transmitter Tx) are arranged outside the stripe region on the plane of the touch panel 110*a*. However, the stripe region (as the mutual-capacitance receiver Rx) is not limited to include one row on the touch panel 110*a*.

Figure 8:
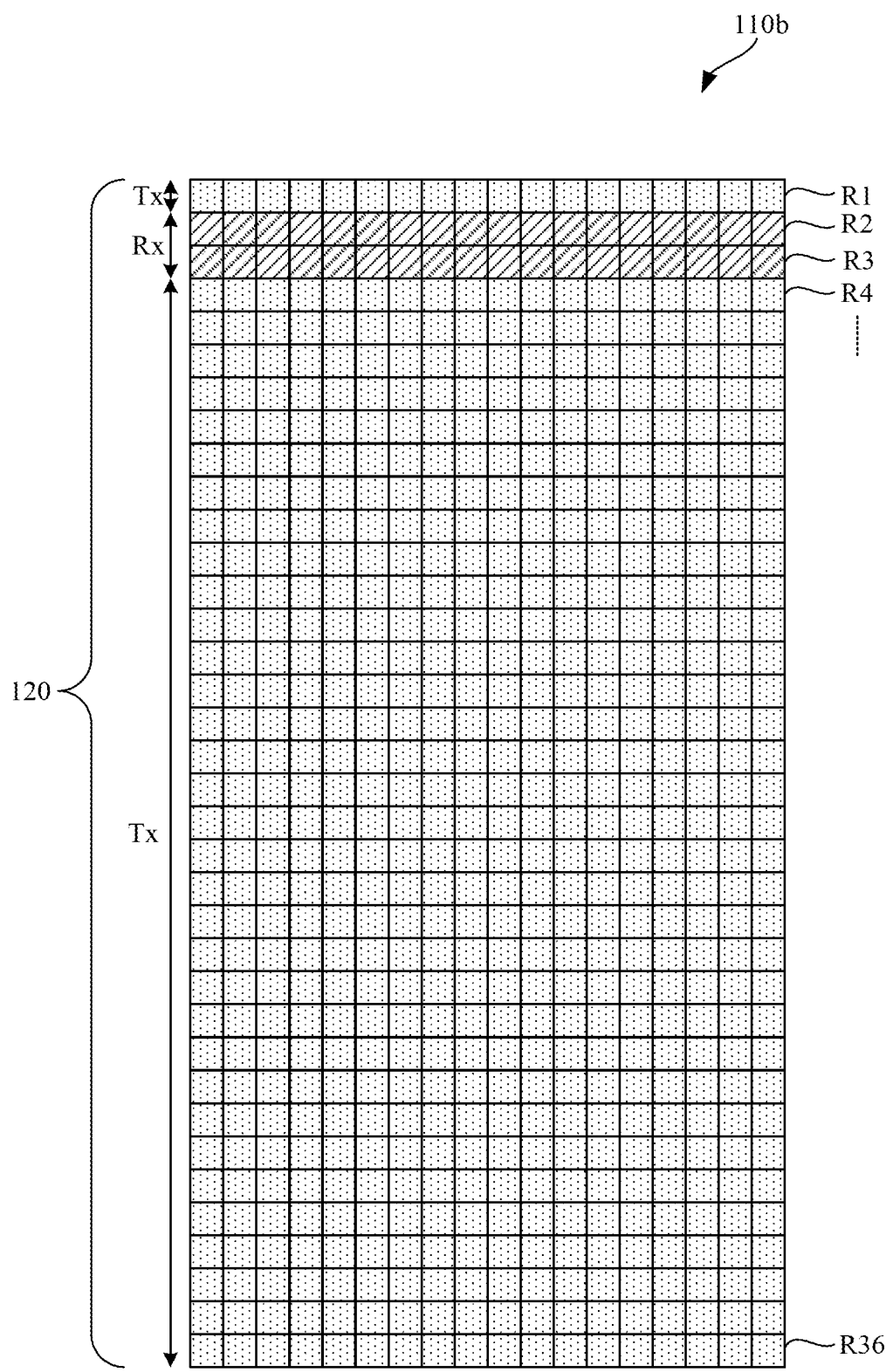
FIG. 8 is a schematic diagram illustrating the capacitive sensors on a touch panel with a second grouping layout during the proximity sensing period according to an embodiment of this disclosure.

Reference is further made to FIG. 8, which is a schematic diagram illustrating the capacitive sensors 120 on a touch panel 110*b* with a second grouping layout during the proximity sensing period according to an embodiment of this disclosure. As the touch panel 110*b* with the second grouping layout shown in FIG. 8, the capacitive sensors 120 located on rows R1 and row R4-R36 are divided into the first group, and the capacitive sensors 120 located on rows R2 and R3 are divided into the second group. In this case, a stripe region (including the rows R2 and R3) are set as the second group. The capacitive sensors 120 in the first group (as the mutual-capacitance transmitter Tx) are arranged outside the stripe region on the plane of the touch panel 110*b*. In this example, during the proximity sensing period P2, the controller 140 is configured to set the first group of capacitive sensors 120 (on the rows R1 and R4-R36) as a mutual-capacitance transmitter Tx, and set the second group of capacitive sensors 120 (on the rows R2 and R3) as a mutual-capacitance receiver Rx. Behaviors and functions of the capacitive sensors 120 on a touch panel 110*b* in FIG. 8 are similar to aforesaid embodiments discussed above along with FIG. 1 to FIG. 7, and not to be repeated here. Differences between the touch panel 110*b* in FIG. 8 and the touch panel 110*a* in FIG. 5 is that the mutual-capacitance receiver Rx covers a larger area (two rows R2 and R3) in FIG. 8 compared to a smaller area (one row R3) in FIG. 5, such that an induced current collected as the sensing signal Sin from the mutual-capacitance receiver Rx to the controller 140 can be enlarged in the embodiments shown in FIG. 8.

It is noticed that, the mutual-capacitance receiver Rx is not limited to be arranged on two adjacent rows, such as the row R2 and R3 shown in FIG. 8. In some other embodiments, the mutual-capacitance receiver Rx can be arranged on two non-adjacent rows, such as the row R2 and the row R4 (not shown in figures).

Figure 9:
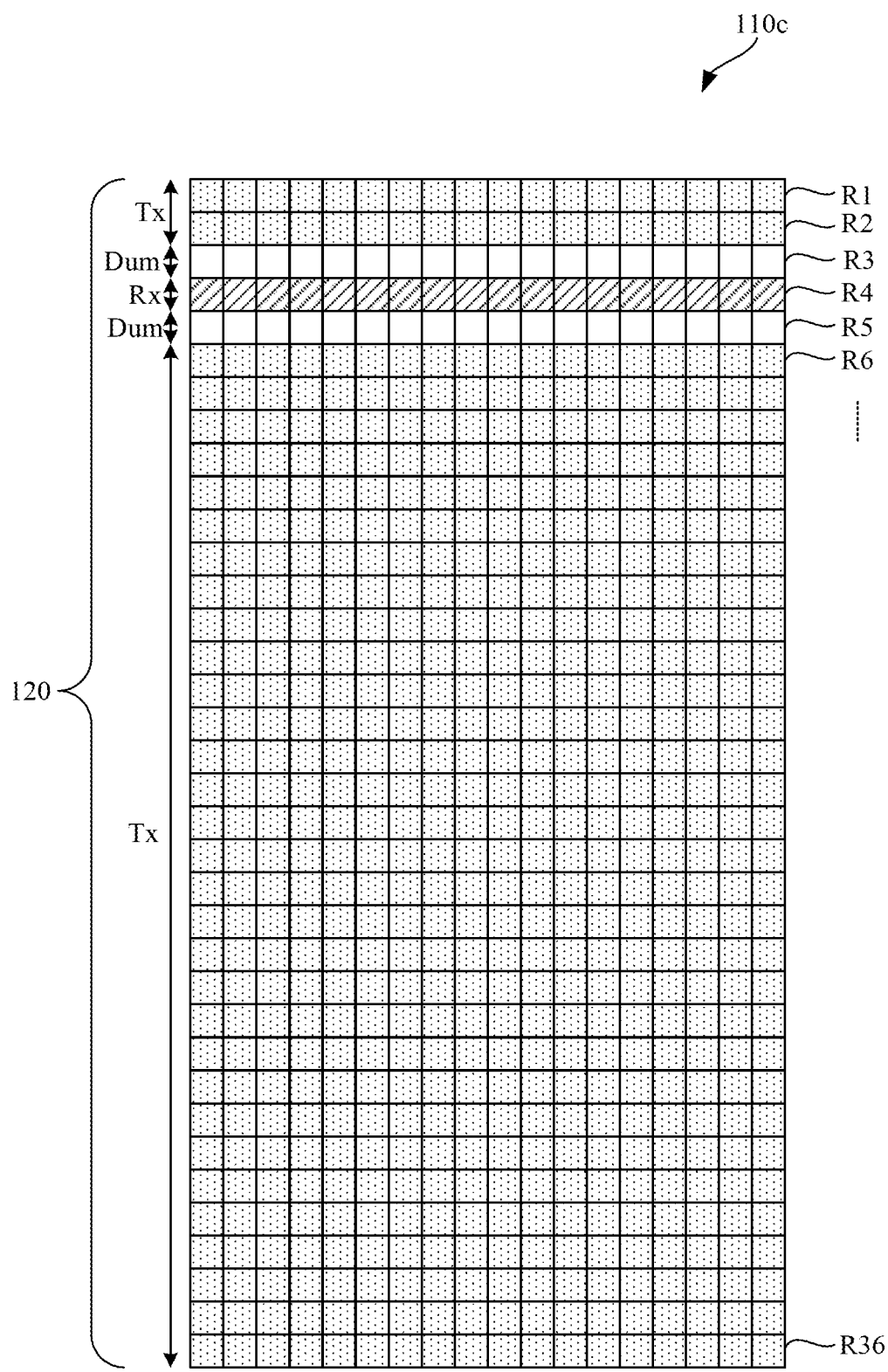
FIG. 9 is a schematic diagram illustrating the capacitive sensors on a touch panel with a third grouping layout during the proximity sensing period according to an embodiment of this disclosure.

Reference is further made to FIG. 9, which is a schematic diagram illustrating the capacitive sensors 120 on a touch panel 110c with a third grouping layout during the proximity sensing period according to an embodiment of this disclosure.

As shown in FIG. 9, during the proximity sensing period P2, the controller 140 is configured to divide the capacitive sensors 120 into the first group (including the rows R1, R2 and R6~R36 as the mutual-capacitance transmitter Tx), the second group (including the row R4 as the mutual-capacitance receiver Rx) and a third group (including the rows R3 and R5). In some embodiments, the controller 140 is configured to generate a fixed voltage signal to the capacitive sensors 120 in the third group (on the rows R3 and R5) or keep the capacitive sensors 120 in the third group at a floating voltage level.

In this case, the capacitive sensors 120 in the third group are utilized as dummy sensors Dum during the proximity sensing period P2. These dummy sensors Dum are located between the capacitive sensors 120 in the first group (as the mutual-capacitance transmitter Tx) and the capacitive sensors in the second group (as the mutual-capacitance receiver Rx). The dummy sensors Dum in the third group are able to provide a gap distance between the mutual-capacitance transmitter Tx and the mutual-capacitance receiver Rx, so as to reduce a circuitry noise (between adjacent rows) and adjust a sensibility relative to the proximity event PE. In some embodiments, the interface device 100 is too sensitive to the proximity event PE, and these dummy sensors Dum can be added to adjust the sensibility.

In aforesaid embodiments (along with the touch panel 110a-110c in FIG. 5, FIG. 8 and FIG. 9), in response to the pulse signal PTx, the second group of capacitive sensors on the stripe region is utilized as one mutual-capacitance receiver Rx for generating one sensing signal Sin for detecting one capacitance variance between the first group of capacitive sensors (Tx) and the second group of capacitive sensors (Rx), such that the controller 140 determines that the proximity event PE occurs if the one capacitance variance exceeds a threshold value. In some embodiments, the threshold value can be configured as 10%, 20% or 40% of an original capacitance reading (when there is not proximity event).

Figure 10:
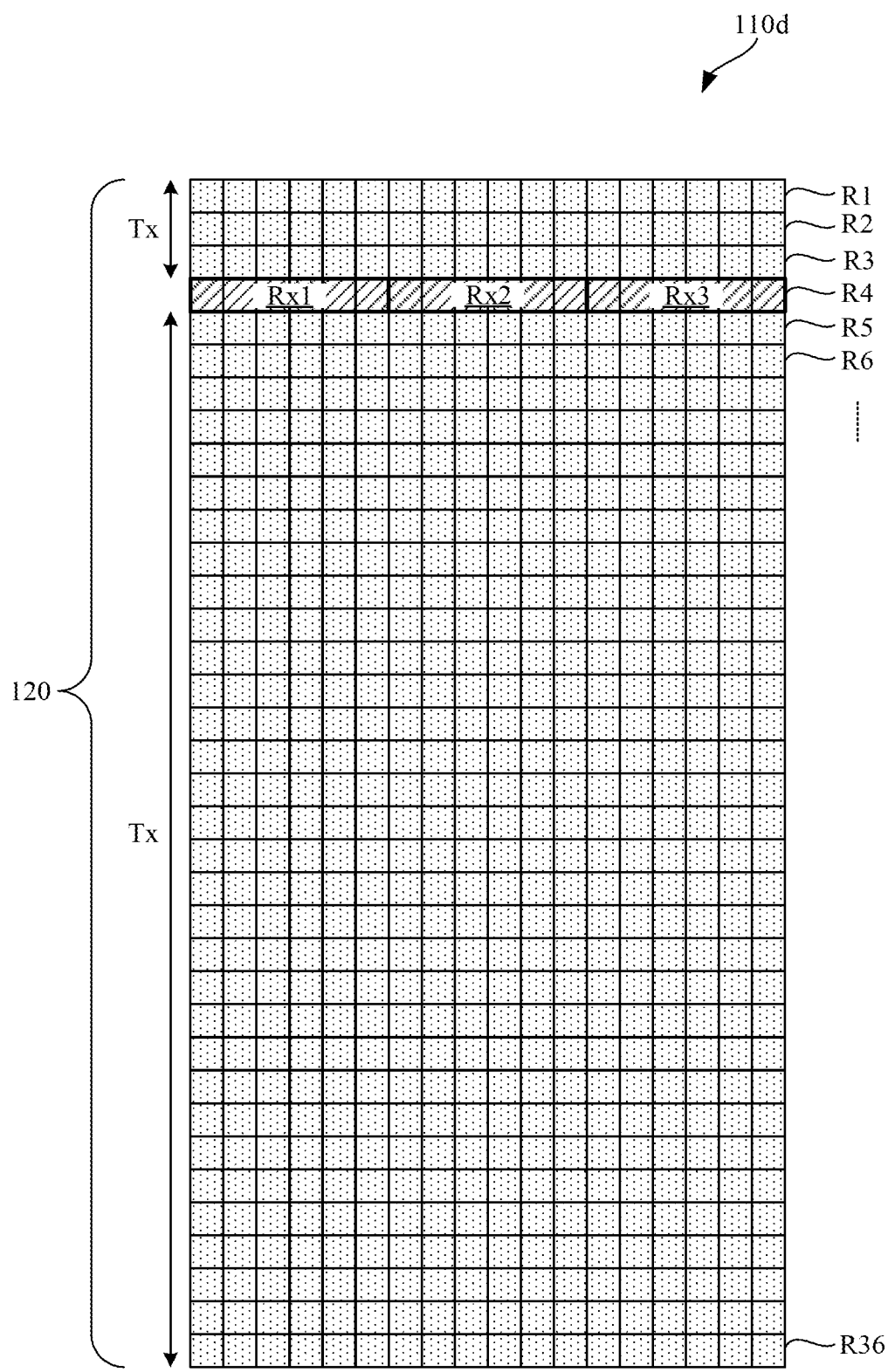
FIG. 10 is a schematic diagram illustrating the capacitive sensors on a touch panel with a fourth grouping layout during the proximity sensing period according to an embodiment of this disclosure.

However, the disclosure is not limited to form one mutual-capacitance receiver Rx and detect one capacitance variance. Reference is further made to FIG. 10, which is a schematic diagram illustrating the capacitive sensors 120 on a touch panel 110d with a fourth grouping layout during the proximity sensing period according to an embodiment of this disclosure.

As shown in FIG. 10, the controller is further configured to divide the second group of capacitive sensors (e.g., the capacitive sensors on a row R4) into K sub-groups. K is a positive integer greater than 1. The K sub-groups of capacitive sensors are utilized as mutual-capacitance receivers for generating K sensing signals for detecting K capacitance variances between the first group of capacitive sensors (e.g., the capacitive sensors on rows R1~R3 and R5~R36) and the K sub-groups of capacitive sensors. In some embodiments, the controller 140 determines that the proximity event PE occurs if at least one of the K capacitance variances exceeds a threshold value. In some other embodiments, the controller 140 determines that the proximity event PE occurs if all of the K capacitance variances exceed the threshold value, so as to prevent over-sensitivity of the proximity sensing.

Figure 11:
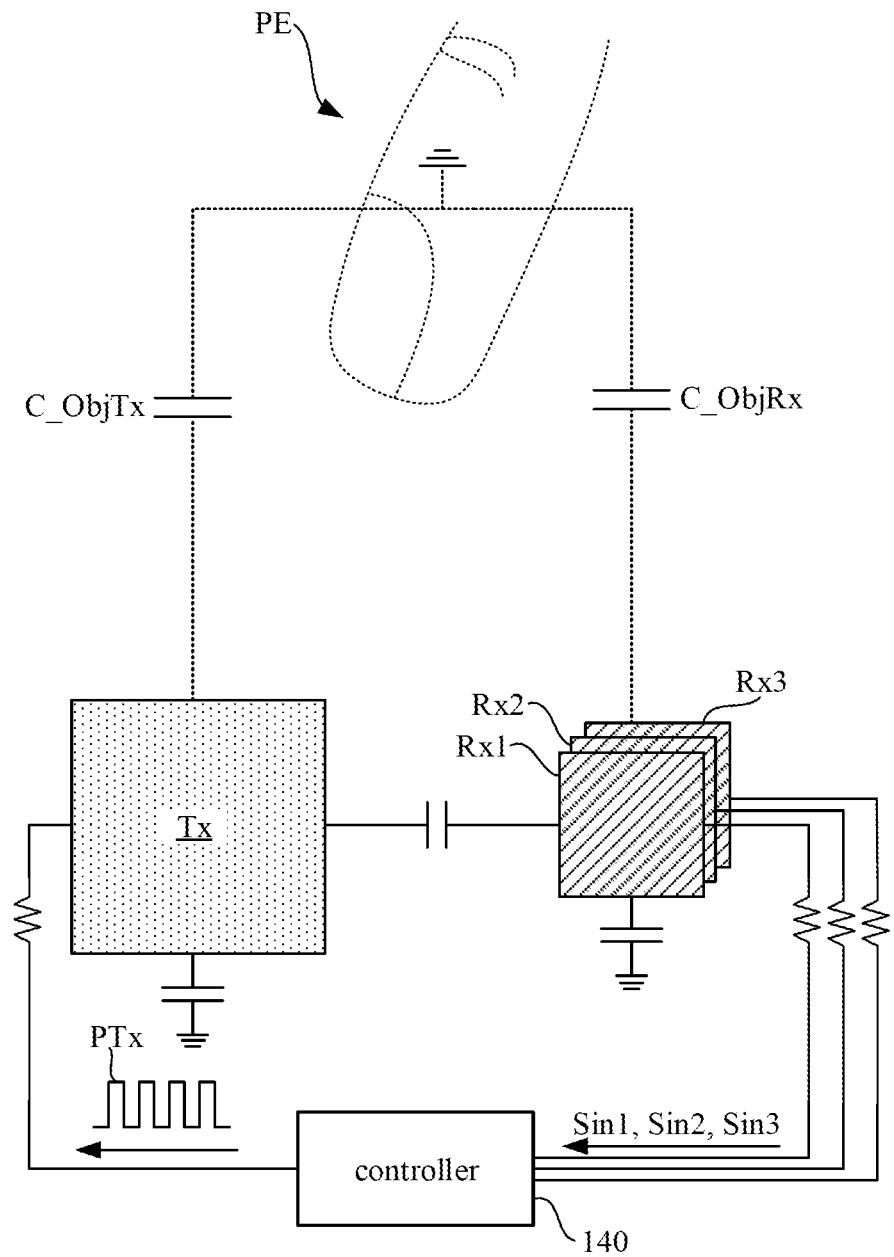
FIG. 11 is a schematic diagram illustrating a circuit structure formed by the mutual-capacitance transmitter and the mutual-capacitance receivers during the proximity sensing period corresponding to an embodiment of the touch panel shown in FIG. 10.

In the embodiments shown in FIG. 10, K is equal to three. The capacitive sensors on the row R4 are divided into three sub-groups. The sub-group on the left is set as a mutual-capacitance receiver Rx1; the sub-group in the middle is set as another mutual-capacitance receiver Rx2; the sub-group on the right is set as another mutual-capacitance receiver Rx3. Reference is further made to FIG. 11, which is a schematic diagram illustrating a circuit structure formed by the mutual-capacitance transmitter Tx and the mutual-capacitance receivers Rx1~Rx3 during the proximity sensing period P2 corresponding to an embodiment of the touch panel 110d shown in FIG. 10. The controller 140 is configured to collect three sensing signals Sin1~Sin3 from the mutual-capacitance receivers Rx1~Rx3 in response to the pulse signal PTx. In this case, the controller 140 determines that the proximity event PE occurs if all of these three capacitance variances exceed the threshold value. Based on aforesaid embodiment shown in FIG. 10 and FIG. 11, the proximity event PE is detected when all of the mutual-capacitance receivers Rx1~Rx3 detect the capacitance variances. It helps to reduce a false activation probability about proximity sensing and to solve an over-sensibility issue about the proximity sensing.

Figure 12A:
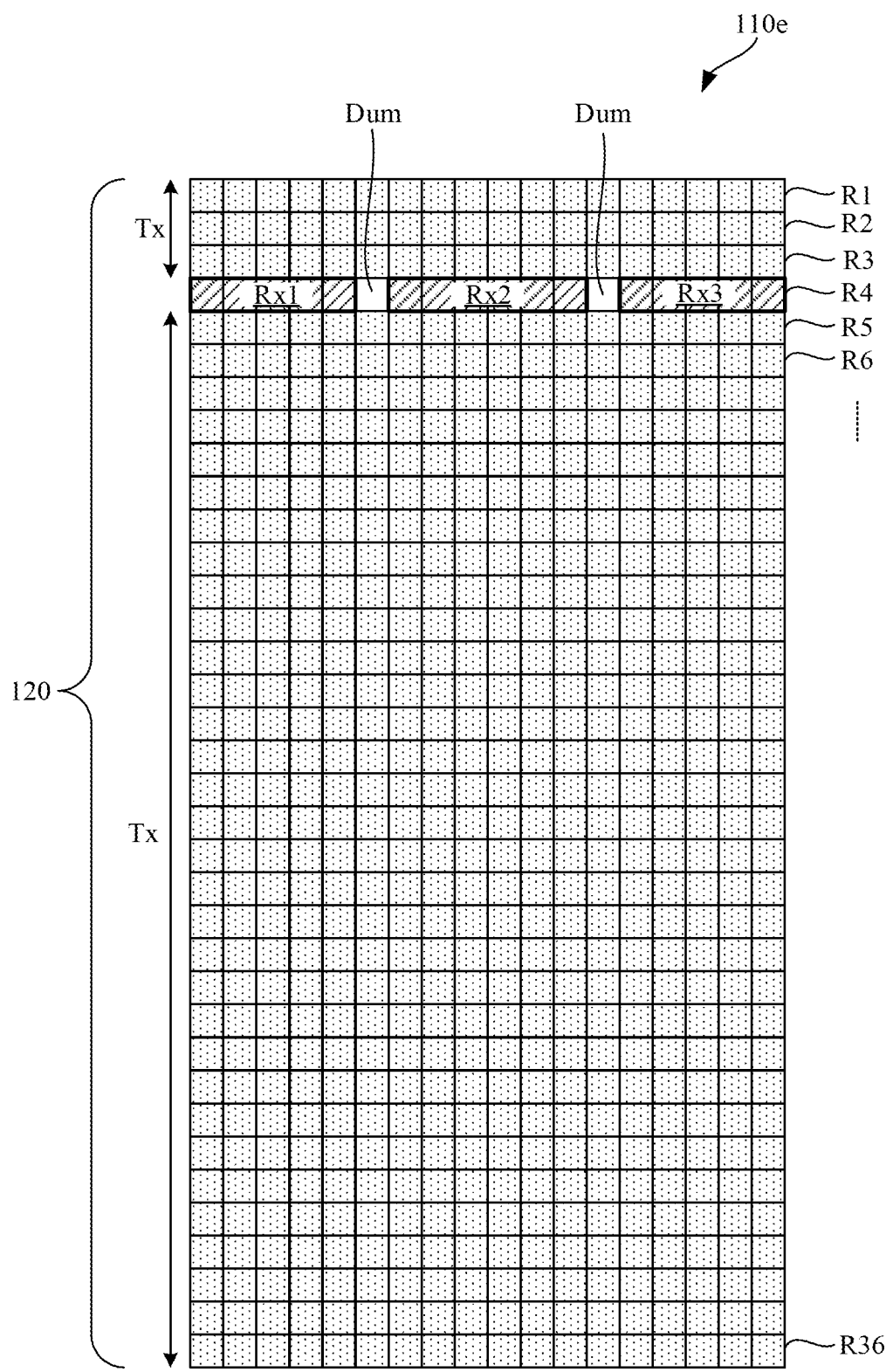
FIG. 12A is a schematic diagram illustrating the capacitive sensors on a touch panel with a fifth grouping layout during the proximity sensing period according to an embodiment of this disclosure.

Reference is further made to FIG. 12A. FIG. 12A is a schematic diagram illustrating the capacitive sensors 120 on a touch panel 110e with a fifth grouping layout during the proximity sensing period according to an embodiment of this disclosure. In the embodiment shown in FIG. 12A, the capacitive sensors on the row R4 are divided into three sub-groups. The sub-group on the left is set as a mutual-capacitance receiver Rx1; the sub-group in the middle is set as another mutual-capacitance receiver Rx2; the sub-group on the right is set as another mutual-capacitance receiver Rx3. In addition, some capacitive sensors on the row R4 are configured as dummy sensors Dum. As shown in FIG. 12A, one dummy sensor Dum is arranged between the mutual-capacitance receivers Rx1 and Rx2, and another dummy sensor Dum is arranged between the mutual-capacitance receivers Rx2 and Rx3.

Figure 12B:
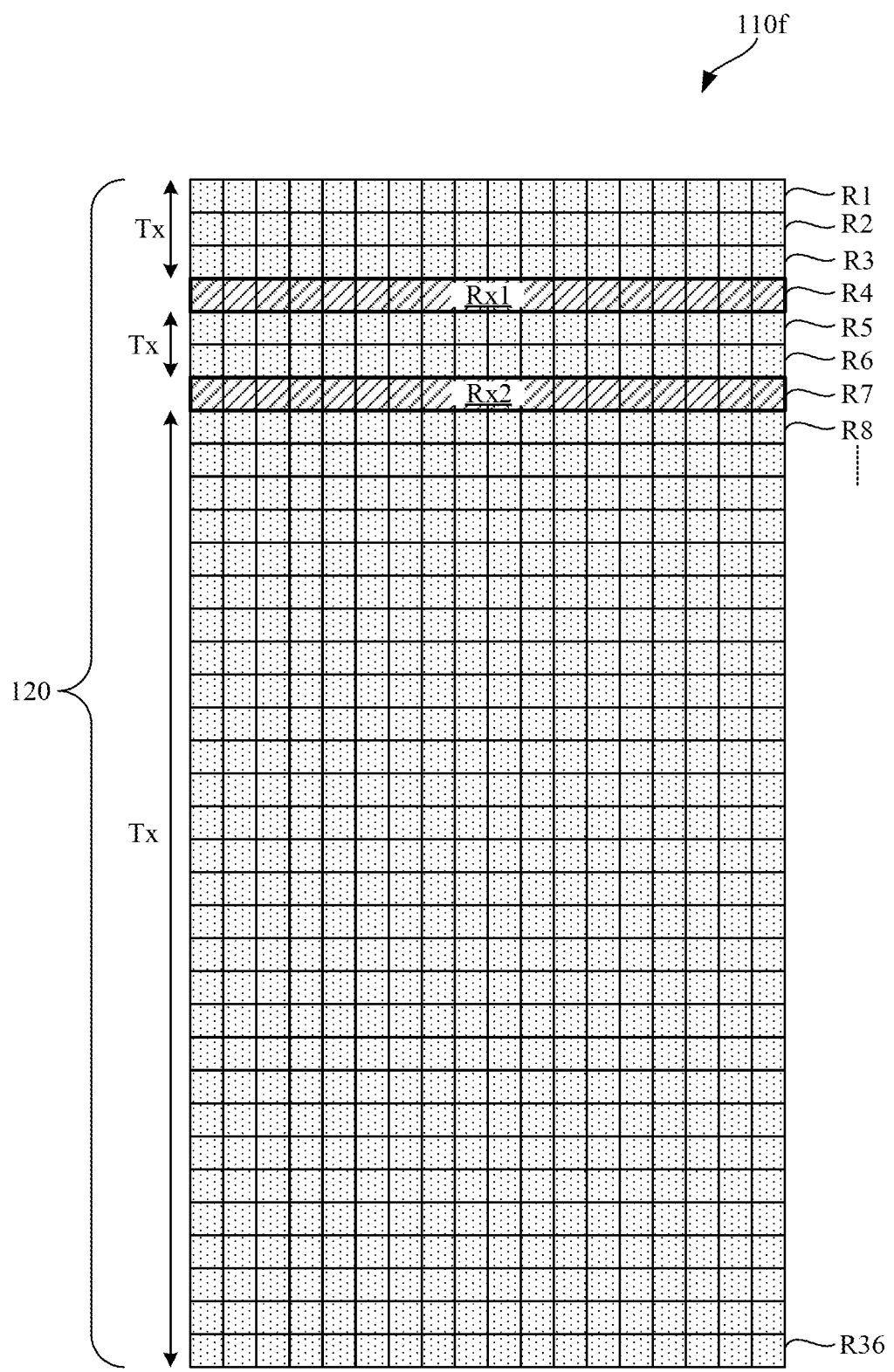
FIG. 12B is a schematic diagram illustrating the capacitive sensors on a touch panel with a sixth grouping layout during the proximity sensing period according to an embodiment of this disclosure.

Reference is further made to FIG. 12B. FIG. 12B is a schematic diagram illustrating the capacitive sensors 120 on a touch panel 110f with a sixth grouping layout during the proximity sensing period according to an embodiment of this disclosure.

As shown in FIG. 12B, the capacitive sensors 120 are arranged in rows and columns on the plane of the touch panel 110f. The capacitive sensors 120 are divided into a first group and a second group. The capacitive sensors 120 in the second group are arranged on two stripe regions (e.g., mutual-capacitance receivers Rx1 and Rx2 are located on rows R4 and row R7) on the plane. The capacitive sensors 120 in the first group are arranged outside the two stripe regions (e.g., the mutual-capacitance transmitter Tx is located on rows R1~R3, R5~R6 and R8~R36).

As shown in FIG. 12B (also referring to FIG. 11), in response to the pulse signal PTx, the second group of capacitive sensors on the two stripe regions are utilized as two mutual-capacitance receivers Rx1 and Rx2 for generating two sensing signals Sin1 and Sin2 for detecting two capacitance variances between the first group of capacitive sensors (i.e., the mutual-capacitance transmitter Tx) and the second group of capacitive sensors on the two stripe regions (i.e., the mutual-capacitance receivers Rx1 and Rx2), the controller 140 detects the proximity event PE according to these two capacitance variances. If both of the two capacitance variances exceed a threshold value, the controller 140 will determine that the proximity event PE occurs.

Figure 13:
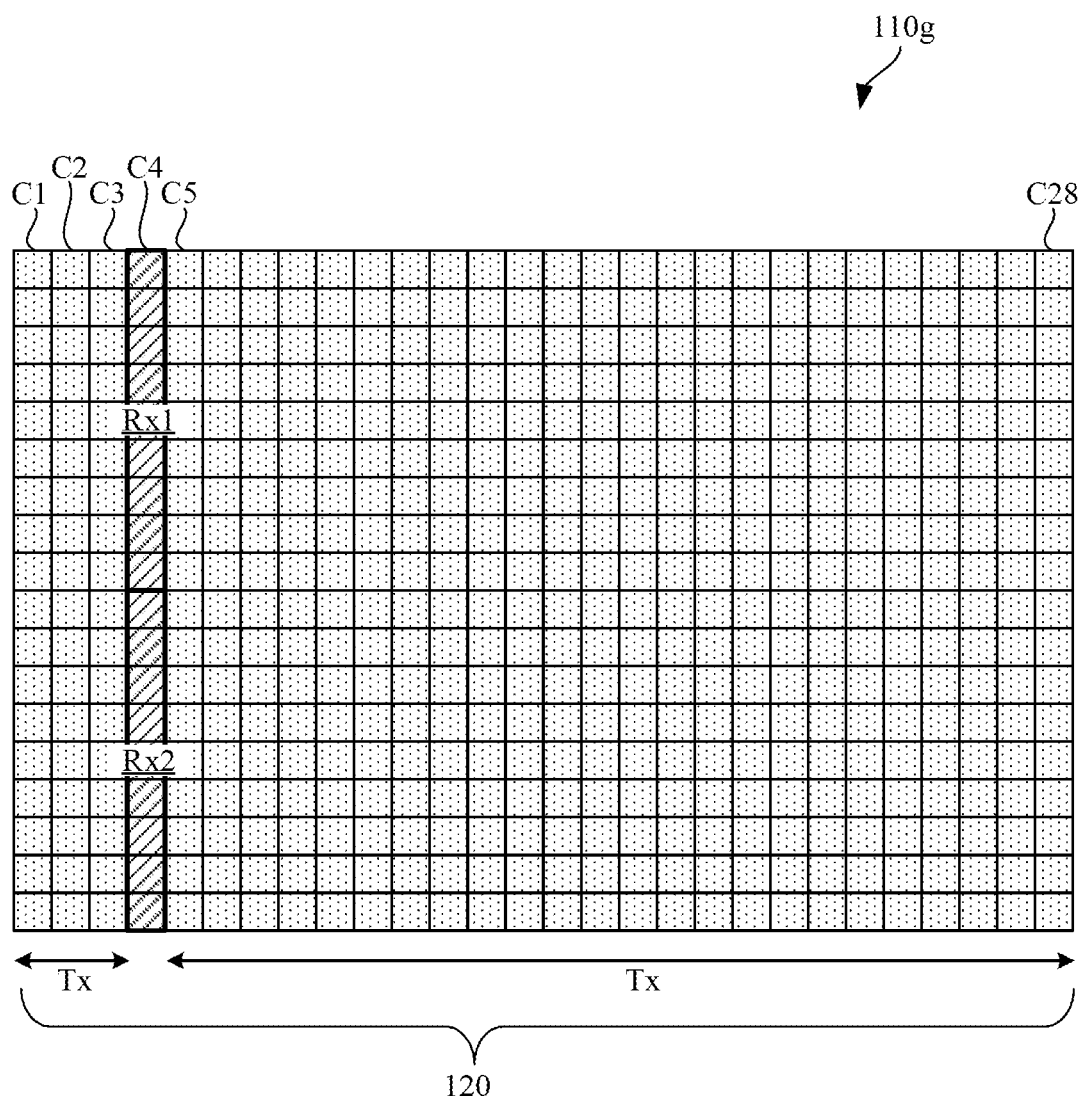
FIG. 13 is a schematic diagram illustrating the capacitive sensors on a touch panel with a seventh grouping layout during the proximity sensing period according to an embodiment of this disclosure.

In aforesaid embodiments shown in FIG. 5 to FIG. 12B, the capacitive sensors 120 are grouped by different rows. However, the disclosure is not limited thereto. Reference is further made to FIG. 13, which is a schematic diagram illustrating the capacitive sensors 120 on a touch panel 110g with a seventh grouping layout during the proximity sensing period according to an embodiment of this disclosure.

As shown in FIG. 13, the capacitive sensors 120 are arranged in rows and columns on the plane of the touch panel 110g. The capacitive sensors 120 are divided into a first group and a second group. The capacitive sensors 120 in the second group are arranged on one stripe region (e.g., mutual-capacitance receivers Rx1 and Rx2 are located on a top side and a bottom side of column C4) on the plane. The capacitive sensors 120 in the first group are arranged outside the stripe region (e.g., the mutual-capacitance transmitter Tx is located on columns C1~C3 and C5~C28).

Amounts of rows and columns illustrated in embodiments shown in FIG. 5 to FIG. 13 are for demonstration. The disclosure is not limited to specific amount of rows and columns on the touch panels.

Figure 14A:
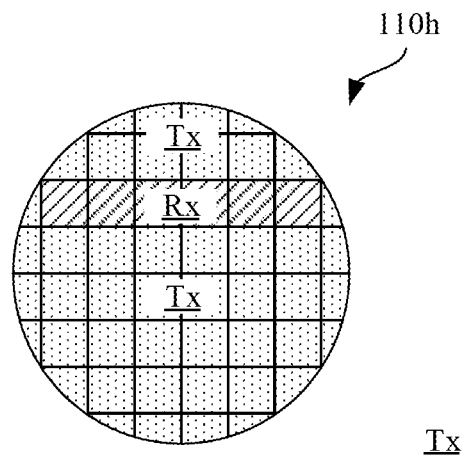
FIG. 14A is a schematic diagram illustrating the capacitive sensors on a touch panel with an eighth grouping layout during the proximity sensing period according to an embodiment of this disclosure.
Figure 14B:
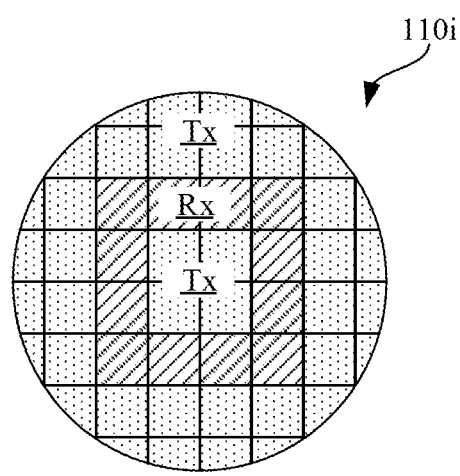
FIG. 14B is a schematic diagram illustrating the capacitive sensors on a touch panel with a ninth grouping layout during the proximity sensing period according to an embodiment of this disclosure.

In some other embodiments, the touch panel 110 of the interface device 100 is not limited to a rectangular shape. Reference is further made to FIG. 14A and FIG. 14B. FIG. 14A is a schematic diagram illustrating the capacitive sensors 120 on a touch panel 110h with an eighth grouping layout during the proximity sensing period according to an embodiment of this disclosure. FIG. 14B is a schematic diagram illustrating the capacitive sensors 120 on a touch panel 110i with a ninth grouping layout during the proximity sensing period according to an embodiment of this disclosure. As shown in FIG. 14A, the mutual-capacitance receiver Rx is arranged on a stripe region on the round touch panel 110h, and the mutual-capacitance transmitter Tx is arranged outside and surrounding the stripe region on the round touch panel 110h. As shown in FIG. 14B, the mutual-capacitance receiver Rx is arranged on a frame shape within the round touch panel 110i, and the mutual-capacitance transmitter Tx is arranged at an outer ring and at an inside position relative to the frame-shaped mutual-capacitance receiver Rx on the round touch panel 110i. These different layouts of the mutual-capacitance receiver Rx and the mutual-capacitance transmitter Tx are all possible distributions to achieve the interface device 100 as discussed in aforesaid embodiments.

In aforesaid embodiments, the controller 140 is capable to detect information about the touch event TE and the proximity event PE based on capacitance variances sensed by the capacitive sensors 120. However, the disclosure is not limited thereto. In some other embodiments, the controller 140 is capable to detect information about a three-dimensional gesture event based on capacitance variances sensed by the capacitive sensors 120.

Figure 15A:
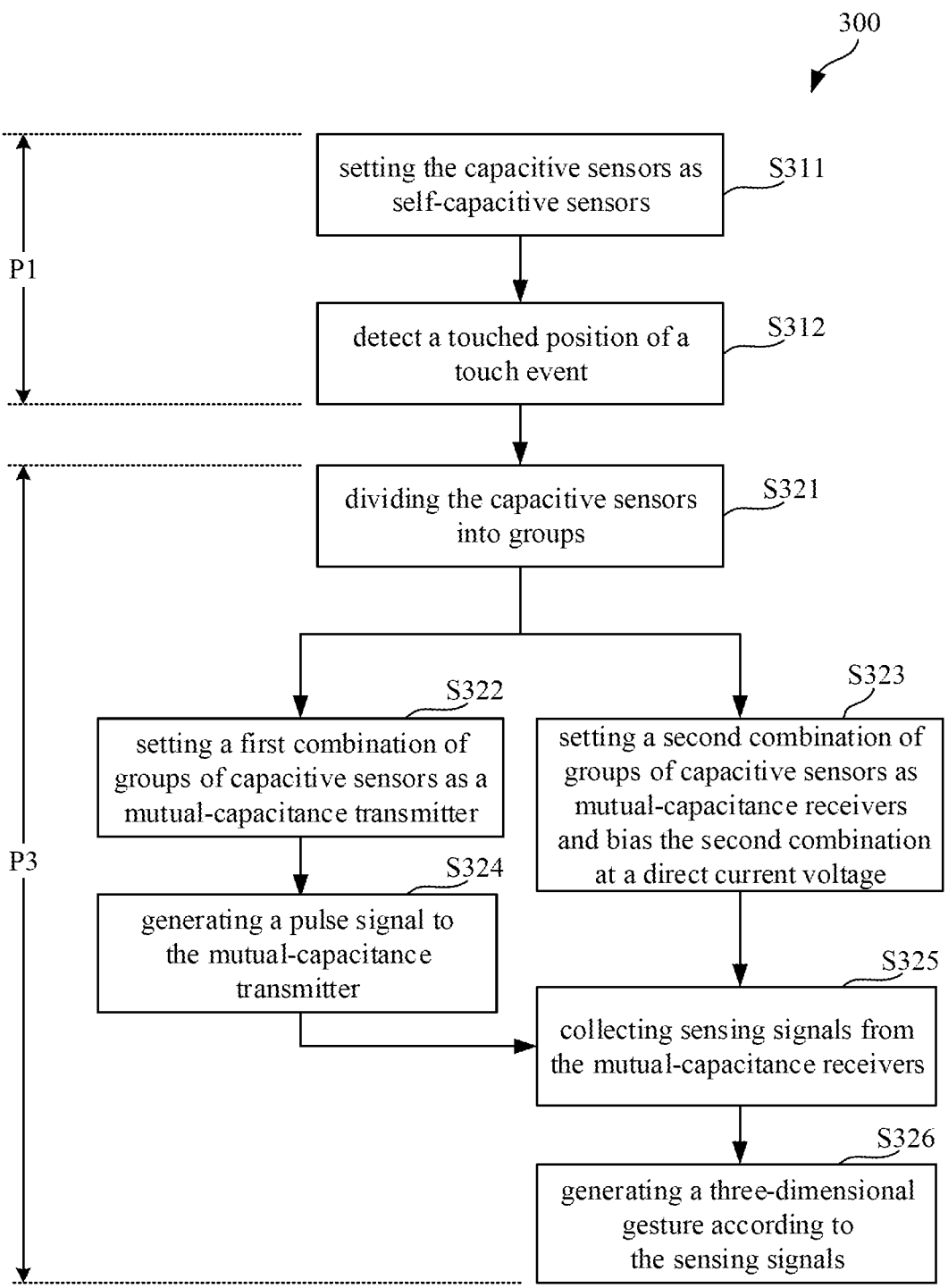
FIG. 15A is a flow chart illustrating a control method according to some embodiments of the disclosure.
Figure 15B:
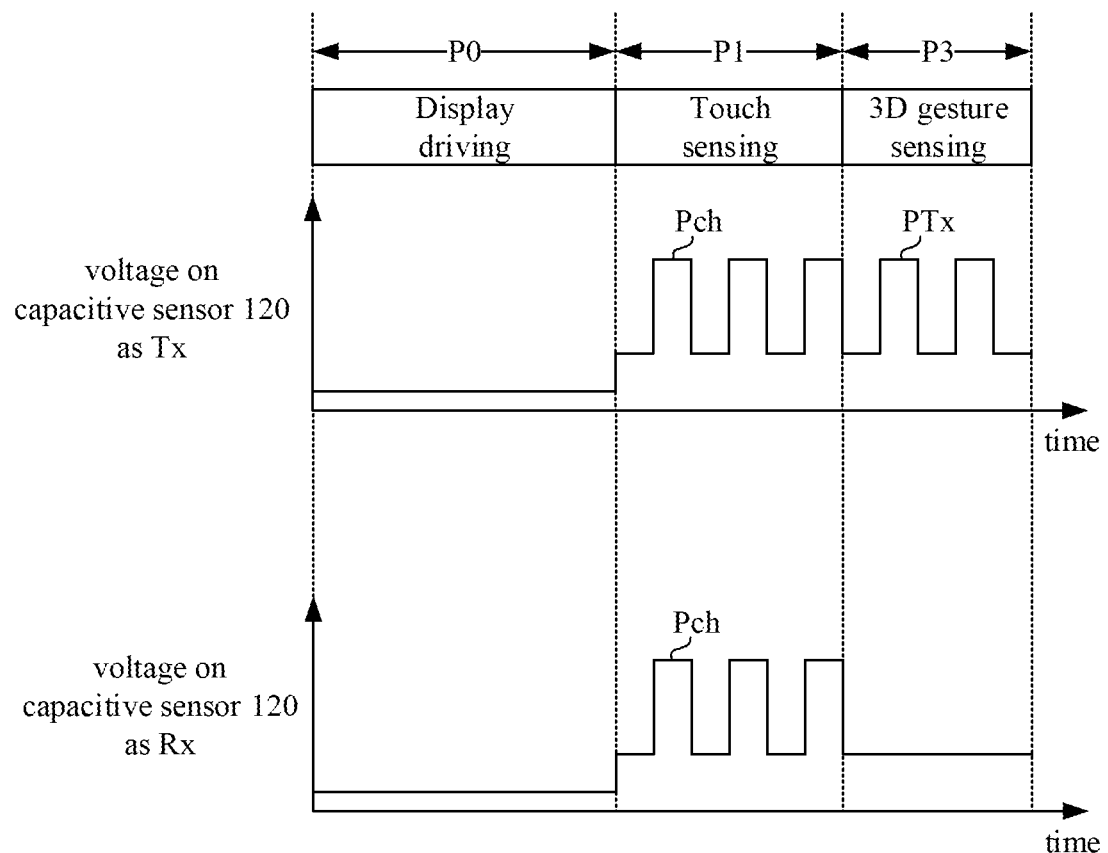
FIG. 15B a time diagram illustrating signals provided by the controller to the capacitive sensors over time in different periods.

Reference is further made to FIG. 15A and FIG. 15B. FIG. 15A is a flow chart illustrating a control method 300 according to some embodiments of the disclosure. In some embodiments, the control method 300 shown in FIG. 15A is suitable to be executed by the controller 140 in the interface device 100 as shown in FIG. 1. FIG. 15B is a time diagram illustrating signals provided by the controller 140 to the capacitive sensors 120 over time in different periods. As shown in FIG. 15B, there are three different periods P0, P1 and P3. During a display driving period P0, the interface device 100 may generate some display-related signals (e.g., scan signals, data signals or polarity signals, not shown in figures) to a displayer (not shown in figures) of the interface device 100. FIG. 15A illustrates steps of the control method 300 executed by the controller 140 in the interface device 100 corresponding to periods P1 and P3. During steps S311~S312 in a touch sensing period P1, the controller 140 is configured to set the capacitive sensors 120 individually as self-capacitance sensors. Behaviors and details about the display driving period P0 and the touch sensing period P1 are similar to steps S211~S212 in FIG. 3A and have been discussed in aforesaid embodiments referring to FIG. 1 to FIG. 4, and not repeated here again.

Figure 16:
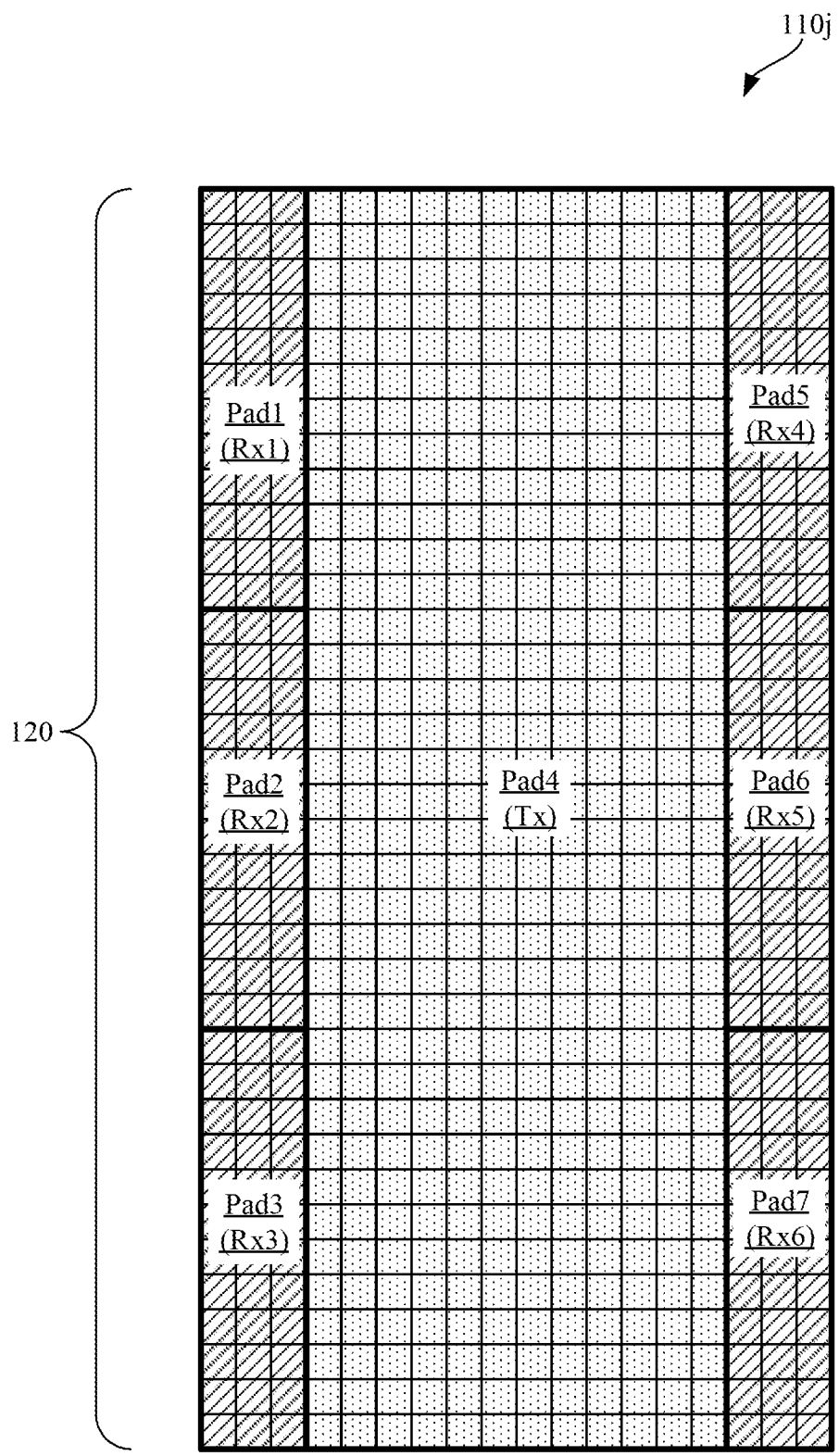
FIG. 16 is a schematic diagram illustrating the capacitive sensors on a touch panel with a tenth grouping layout during a three-dimensional gesture sensing period as shown in FIG. 15.

Reference is further made to FIG. 16, which is a schematic diagram illustrating the capacitive sensors 120 on a touch panel 110j with a tenth grouping layout during a three-dimensional gesture sensing period P3 as shown in FIG. 15A and FIG. 15B.

During the three-dimensional gesture sensing period P3, step S321 is executed by the controller 140 to divide the capacitive sensors 120 into groups. In embodiments shown in FIG. 16, the capacitive sensors 120 are divided into seven groups Pad1, Pad2, Pad3, Pad4, Pad5, Pad6 and Pad7.

In this case, during the three-dimensional gesture sensing period P3, the controller is configured to divide the capacitive sensors 120 into left groups Pad1~Pad3, a middle group Pad4 and right groups Pad5~Pad7. The left groups Pad1 Pad3 are located on different levels along a left edge of the plane. The right groups Pad5~Pad7 are located on different levels along a right edge of the plane. The middle group Pad4 is located around a center of the plane between the left groups Pad1~Pad3 and the right groups Pad5~Pad7.

In this case shown in FIG. 16, the group Pad1 is located around a left-top corner of the plane; the group Pad3 is located around a left-bottom corner of the plane; the group Pad2 is located around the left edge between the group Pad1 and the group Pad3; the group Pad5 is located around a right-top corner of the plane; the group Pad7 is located around a right-bottom corner of the plane; and, the group Pad6 is located around the right edge between the group Pad5 and the group Pad7.

As shown in FIG. 15B and FIG. 16, step S322 is executed by the controller 140 to set a first combination of the groups of capacitive sensors as a mutual-capacitance transmitter Tx, and step S324 is executed to generate a pulse signal PTx to the mutual-capacitance transmitter Tx. In this case, the first combination includes the middle group (i.e., the group Pad4) located at a center of the touch panel 110j. The capacitive sensors 120 in the group Pad4 are set as the mutual-capacitance transmitter Tx.

As shown in FIG. 15B and FIG. 16, step S323 is executed by the controller 140 to set a second combination of the groups of capacitive sensors 120 as mutual-capacitance receivers, and bias the second combination of capacitive sensors 120 at a direct current voltage. In this case, the second combination includes the left groups (i.e., the group Pad1~Pad3) located at a left side of the touch panel 110j and the right groups (i.e., the groups Pad5~Pad7) located at a right side of the touch panel 110j. The capacitive sensors 120 in the group Pad1 are set as the mutual-capacitance receivers Rx1. The capacitive sensors 120 in the group Pad2 are set as the mutual-capacitance receivers Rx2. The capacitive sensors 120 in the group Pad3 are set as the mutual-capacitance receivers Rx3. The capacitive sensors 120 in the group Pad5 are set as the mutual-capacitance receivers Rx4. The capacitive sensors 120 in the group Pad6 are set as the mutual-capacitance receivers Rx5. The capacitive sensors 120 in the group Pad7 are set as the mutual-capacitance receivers Rx6. In some embodiments, during the three-dimensional gesture sensing period P3 as shown in FIG. 15B, the second combination of the groups (i.e., the group Pad1~Pad3 and Pad5~Pad7) of capacitive sensors 120 are biased at a direct current voltage by the controller 140.

Step S325 is executed by the controller 140 to collect six different sensing signals from the mutual-capacitance receivers Rx1~Rx6 in response to the pulse signal PTx (referring to FIG. 11, which shows three sensing signals Sin1~Sin3 collected from three mutual-capacitance receivers Rx1~Rx3). Step S326 is executed by the controller 140 to detect a three-dimensional gesture according to the sensing signals collected from the mutual-capacitance receivers Rx1~Rx6.

Figure 17:
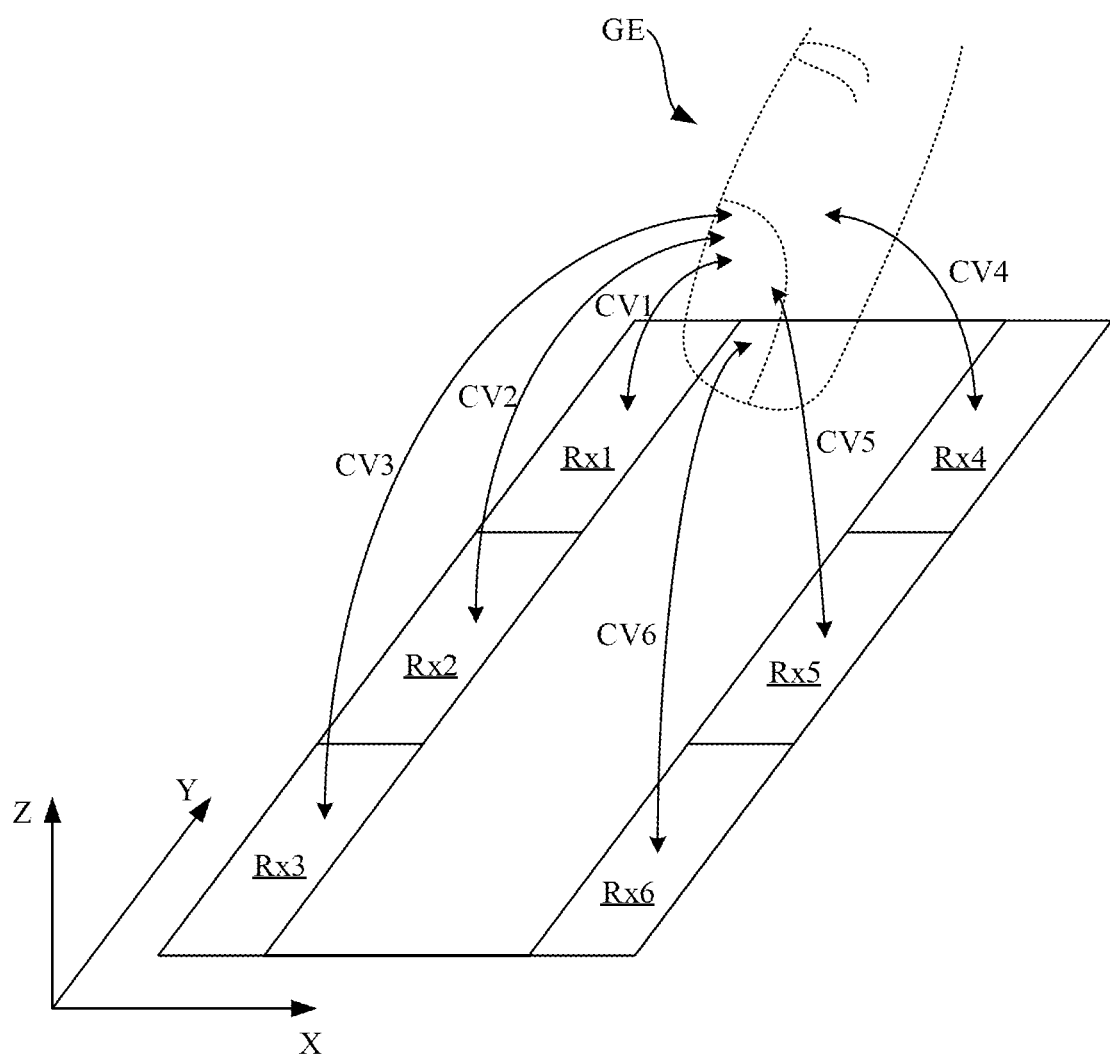
FIG. 17 is a schematic diagram illustrating a three-dimensional gesture relative to the mutual-capacitance receivers as shown in FIG. 16.

Reference is further made to FIG. 17, which is a schematic diagram illustrating a three-dimensional gesture GE relative to the mutual-capacitance receivers Rx1~Rx6 as shown in FIG. 16. As shown in FIG. 17, when there is the three-dimensional gesture GE hovering above, the three-dimensional gesture GE will induce different levels of capacitance variances CV1~CV6 onto the mutual-capacitance receivers Rx1~Rx6.

For example, the three-dimensional gesture GE is relatively closer to the mutual-capacitance receivers Rx1 and Rx4, such that the capacitance variances CV1 and CV4 will be relatively bigger. The three-dimensional gesture GE is relatively away from the mutual-capacitance receivers Rx3 and Rx6, such that the capacitance variances CV3 and CV6 will be relatively smaller.

By comparing the capacitance variances CV1, CV2 and CV3, the controller 140 can obtain Y-axis coordinate of the three-dimensional gesture GE. By comparing the capacitance variances CV1 and CV4 (or CV2 and CV5; or CV3 and CV6), the controller 140 can obtain X-axis coordinate of the three-dimensional gesture GE. Based on an average value of the capacitance variances CV1~CV6, the controller 140 can obtain Z-axis coordinate of the three-dimensional gesture GE. In this case, the controller 140 is configured to detect spatial coordinates of the three-dimensional gesture event GE according to the sensing signals generated by the mutual-capacitance receivers Rx1~Rx6 (formed by the left groups Pad1~Pad3 and the right groups Pad5~Pad7) during the three-dimensional gesture sensing period P3.

In aforesaid embodiments shown in FIG. 15B and FIG. 16, the left groups Pad1~Pad3 and the right groups Pad5~Pad7 are simultaneously utilized as the mutual-capacitance receivers, and only the group Pad4 is utilized as the mutual-capacitance transmitter Tx, such that it will reduce area utilized as the mutual-capacitance transmitter Tx. The disclosure is not limited to embodiments shown in FIG. 15B and FIG. 16.

Figure 18:
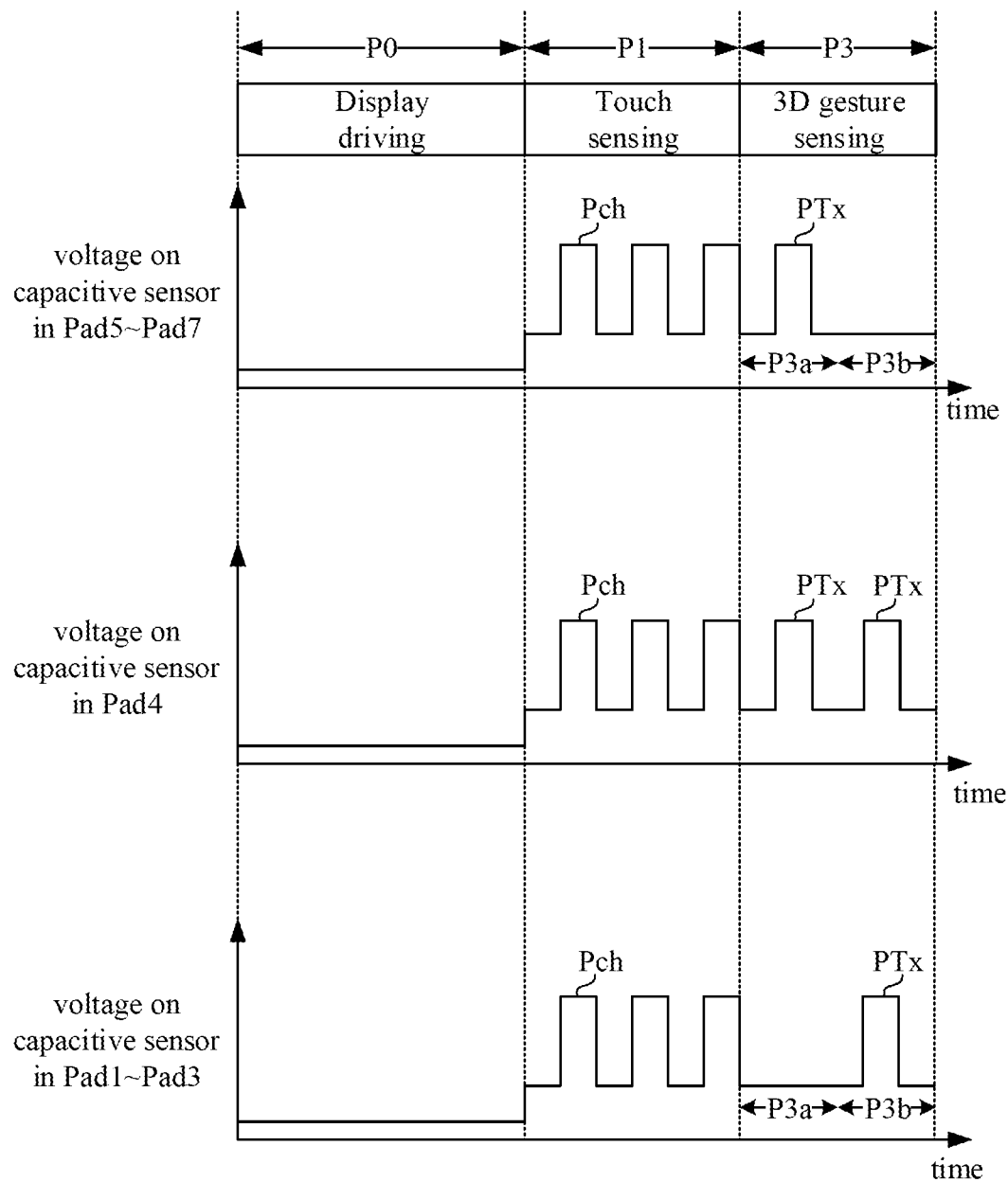
FIG. 18 is a time diagram illustrating signals provided by the controller to the capacitive sensors over time in different periods.

Reference is further made to FIG. 18, which is a time diagram illustrating signals provided by the controller 140 to the capacitive sensors 120 over time in different periods. As shown in FIG. 18, there are three different periods P0, P1 and P3. During a display driving period P0, the interface device 100 may generate some display-related signals (e.g., scan signals, data signals or polarity signals, not shown in figures) to a displayer (not shown in figures) of the interface device 100. During a touch sensing period P1, the controller 140 is configured to set the capacitive sensors 120 individually as self-capacitance sensors. Behaviors and details about the display driving period P0 and the touch sensing period P1 are discussed in aforesaid embodiments referring to FIG. 1 to FIG. 4, and not repeated here again.

Figure 19A:
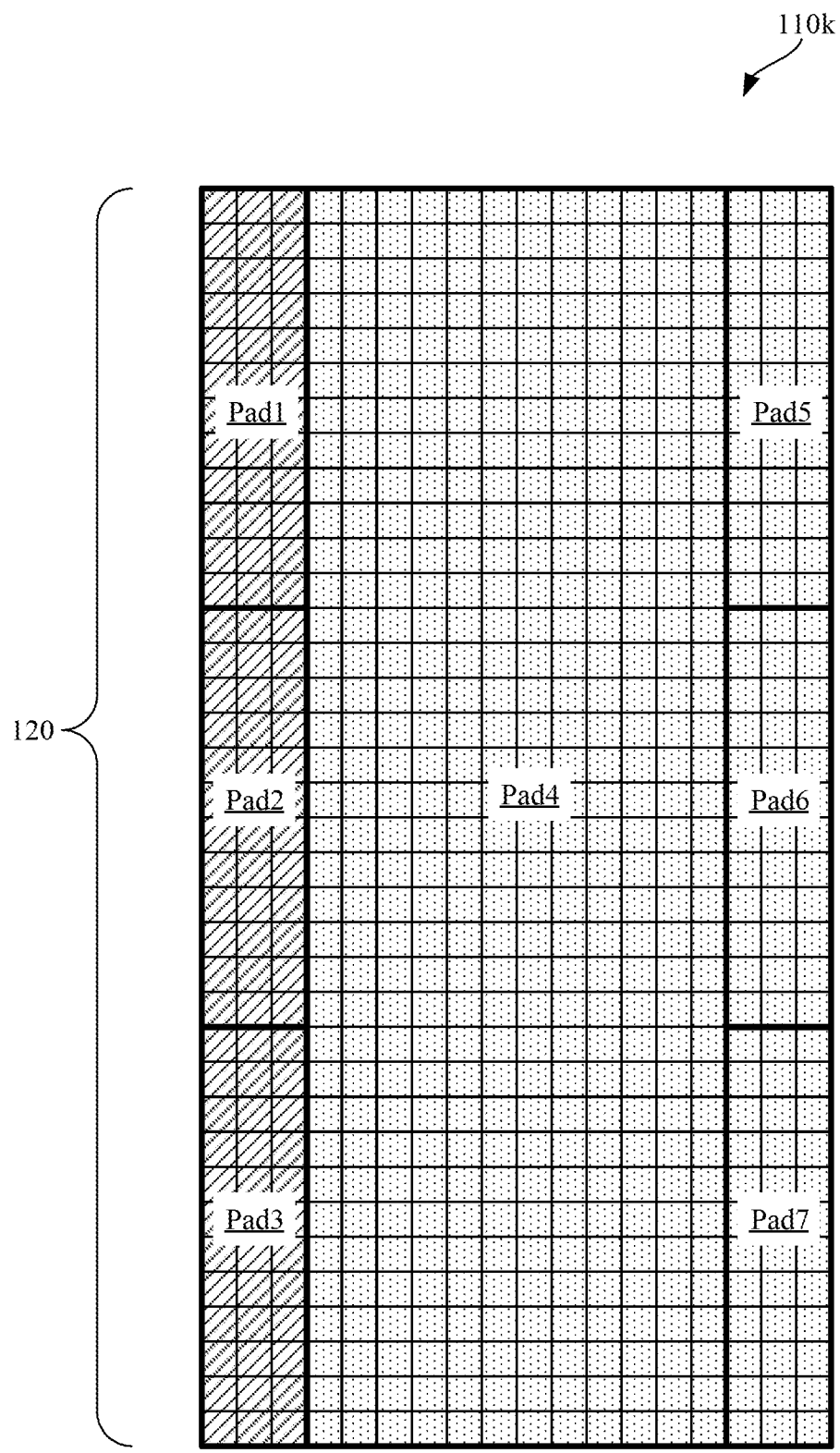
FIG. 19A is a schematic diagram illustrating the capacitive sensors on a touch panel with a $11^{th}$ grouping layout during a first part of the three-dimensional gesture sensing period as shown in FIG. 18.
Figure 19B:
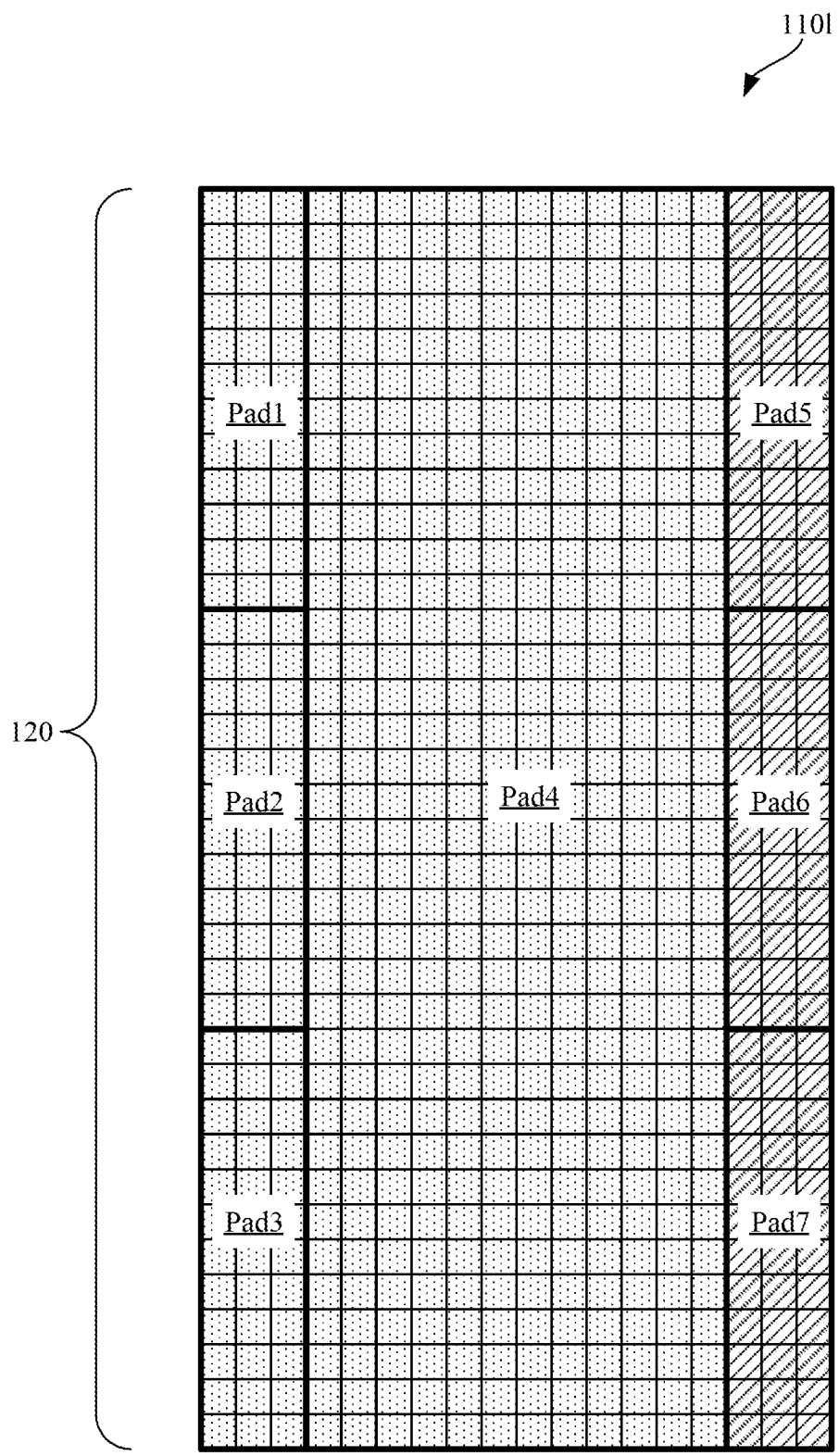
FIG. 19B is a schematic diagram illustrating the capacitive sensors on a touch panel with a $12^{th}$ grouping layout during a second part of the three-dimensional gesture sensing period as shown in FIG. 18.

As shown in FIG. 18, the three-dimensional gesture sensing period P3 includes a first part P3a and a second part P3b. Reference is further made to FIG. 19A and FIG. 19B.

FIG. 19A is a schematic diagram illustrating the capacitive sensors 120 on a touch panel 110k with a 11$^{th}$ grouping layout during a first part P3a of the three-dimensional gesture sensing period P3 as shown in FIG. 18. FIG. 19B is a schematic diagram illustrating the capacitive sensors 120 on a touch panel 110l with a 12$^{th}$ grouping layout during a second part P3b of the three-dimensional gesture sensing period P3 as shown in FIG. 18.

As shown in FIG. 18, the capacitive sensors 120 in the left groups Pad1~Pad3 and the capacitive sensors 120 in the right groups Pad5~Pad7 are alternately utilized as the mutual-capacitance receivers in the first part P3a and the second part P3b of the three-dimensional gesture sensing period P3.

As shown in FIG. 18 and FIG. 19A, during the first part P3a of the three-dimensional gesture sensing period P3, the left groups Pad1~Pad3 are utilized as the mutual-capacitance receivers, and the middle group Pad4 and the right groups Pad5~Pad7 are utilized as the mutual-capacitance transmitters. During the first part P3a, the controller 140 is configured to generate the pulse signal PTx to the mutual-capacitance transmitter formed by the middle group Pad4 and the right groups Pad5~Pad7, and collect sensing signals from the mutual-capacitance receivers formed by the left groups Pad1~Pad3. In some embodiments, during the first part P3a as shown in FIG. 18, the controller 140 is configured to bias the second combination receivers formed by the left groups Pad1~Pad3 at a direct current voltage.

As shown in FIG. 18 and FIG. 19B, during the second part P3b of the three-dimensional gesture sensing period P3, the right groups Pad5~Pad7 are utilized as the mutual-capacitance receivers, and the middle group Pad4 and the left groups Pad1~Pad3 are utilized as the mutual-capacitance transmitters. During the second part P3b, the controller 140 is configured to generate the pulse signal PTx to the mutual-capacitance transmitter formed by the middle group Pad4 and the left groups Pad1~Pad3, and collect sensing signals from the mutual-capacitance receivers formed by the right groups Pad5~Pad7.

In this case, the left groups Pad1~Pad3 and the right groups Pad5~Pad7 are alternately utilized as the mutual-capacitance receivers during the three-dimensional gesture sensing period P3 as shown in FIG. 18.

In aforesaid embodiments shown in FIG. 18, FIG. 19A and FIG. 19B, the left groups Pad1~Pad3 and the right groups Pad5~Pad7 are not simultaneously utilized as the mutual-capacitance receivers at the same time. During the first part P3a, only the left groups Pad1~Pad3 are utilized as the mutual-capacitance receivers; during the second part P3b, only the right groups Pad5~Pad7 are utilized as the mutual-capacitance receivers. The embodiments discussed in FIG. 18, FIG. 19A and FIG. 19B can enlarge area utilized as the mutual-capacitance transmitter Tx, and it may help to increase a sensible range of the three-dimensional gesture GE.

Figure 20:
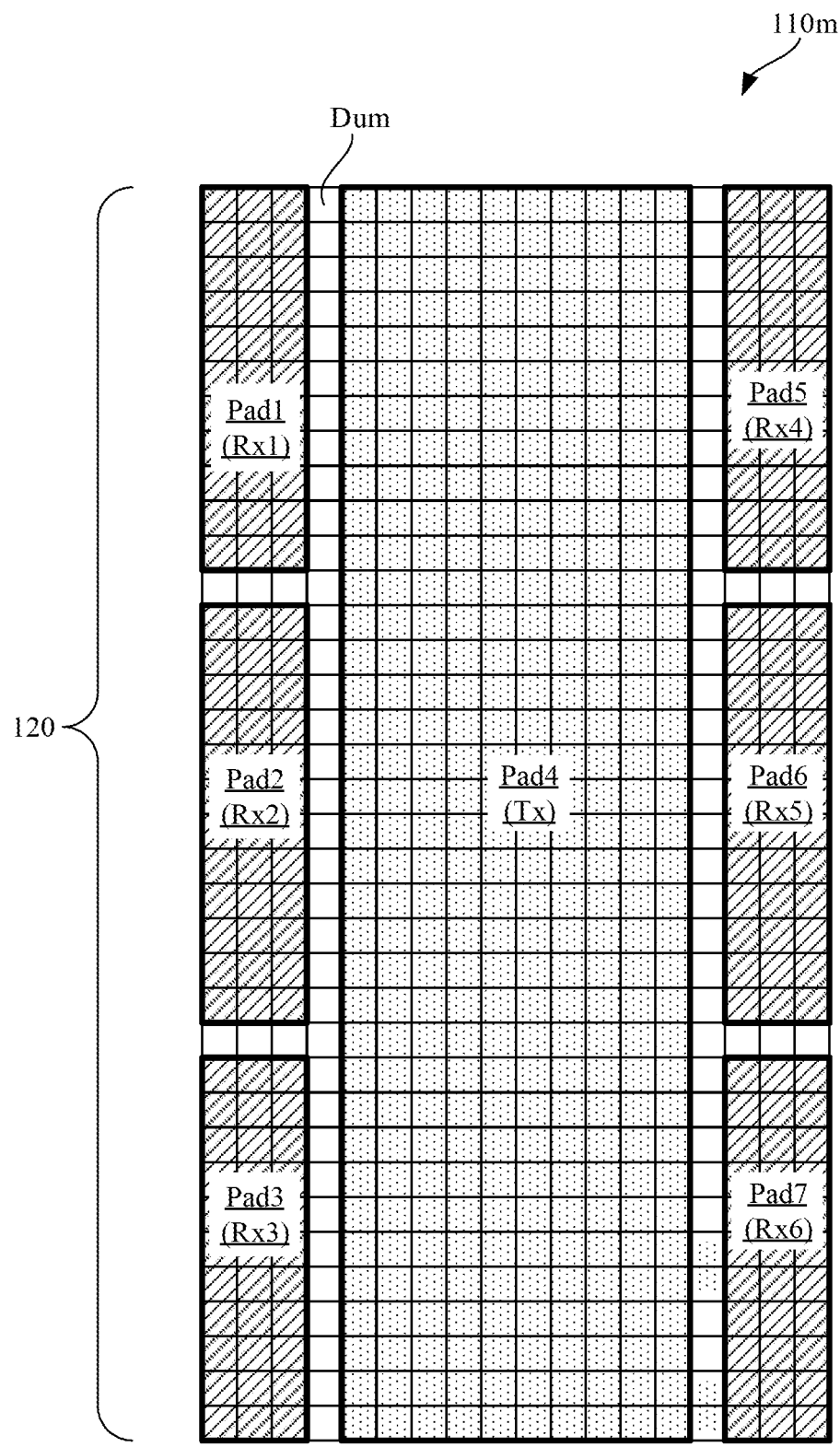
FIG. 20 is a schematic diagram illustrating the capacitive sensors on a touch panel with a $13^{th}$ grouping layout during the three-dimensional gesture sensing period.

Reference is further made to FIG. 20, which is a schematic diagram illustrating the capacitive sensors 120 on a touch panel 110m with a 13$^{th}$ grouping layout during the three-dimensional gesture sensing period P3.

During the three-dimensional gesture sensing period P3, the controller 140 is configured to divide the capacitive sensors 120 into the left groups Pad1~Pad3, the middle group Pad4, the right groups Pad5~Pad7 and a dummy group Dum. The controller 140 is configured to generate a fixed voltage signal to the dummy group Dum of capacitive sensors 120 or keep the dummy group Dum of capacitive sensors 120 at a floating voltage level. The dummy group Dum of capacitive sensors 120 are disposed to isolate adjacent two of the groups Pad1~Pad7.

Figure 21:
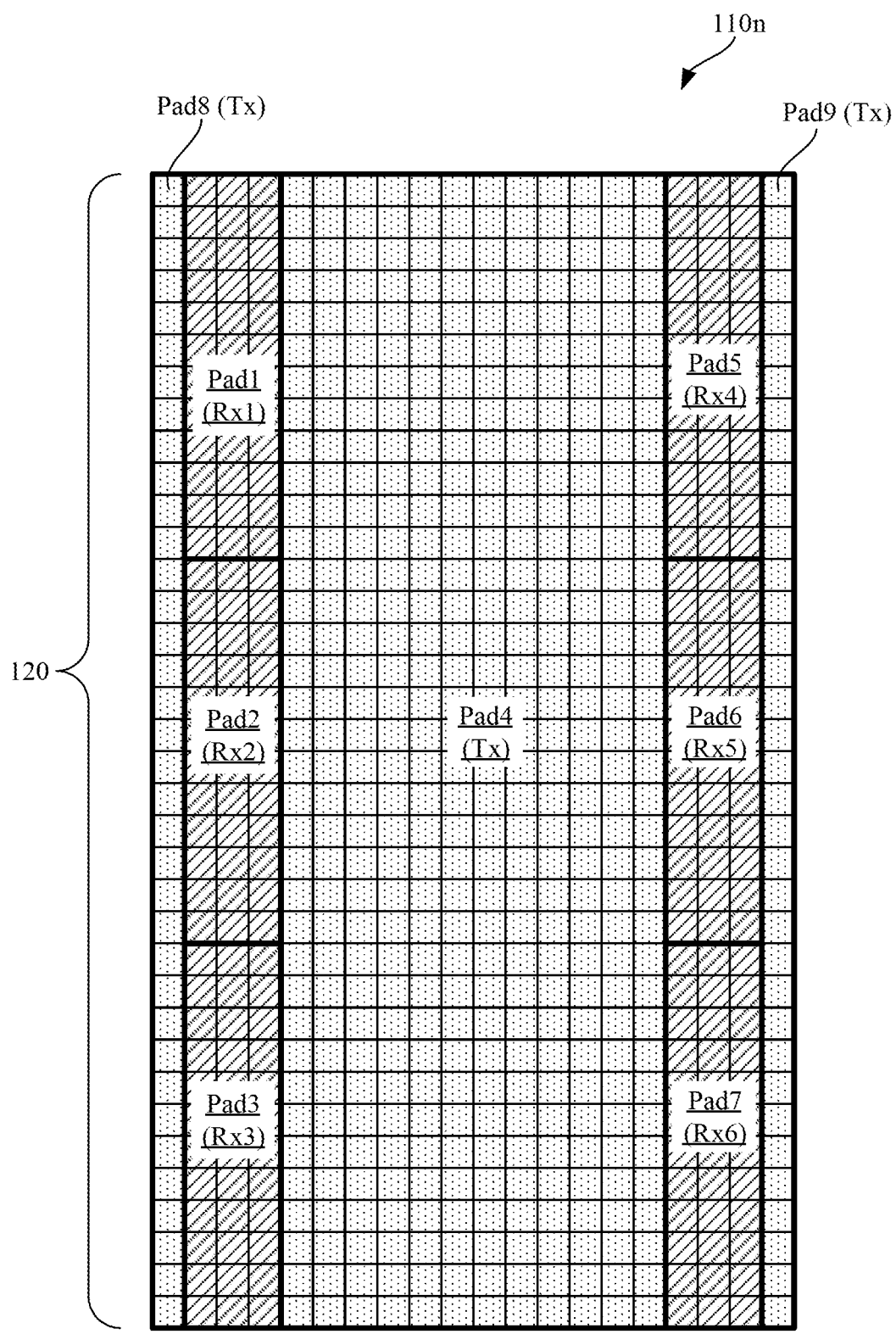
FIG. 21 is a schematic diagram illustrating the capacitive sensors on a touch panel with a $14^{th}$ grouping layout during the three-dimensional gesture sensing period.

In aforesaid embodiments shown in FIG. 16, FIG. 19A and FIG. 19B, the capacitive sensors 120 are divided into seven groups Pad1~Pad7. However, the disclosure is not limited thereto. Reference is further made to FIG. 21, which is a schematic diagram illustrating the capacitive sensors 120 on a touch panel 110*n* with a 14th grouping layout during the three-dimensional gesture sensing period P3.

During the three-dimensional gesture sensing period P3, the controller is configured to divide the capacitive sensors 120 into the groups Pad1~Pad7, a group Pad8 and a group Pad9. The group Pad8 is located between the left edge of the touch panel 110*n* and the groups Pad1~Pad3. The group Pad9 is located between the right edge of the touch panel 110*n* and the groups Pad5~Pad7. During the three-dimensional gesture sensing period P3, the controller 140 is configured to transmit the pulse signal PTx to the group Pad4 of the capacitance sensors 120, the group Pad8 of the capacitive sensors 120 and the group Pad9 of the capacitive sensors 120. In other words, the groups Pad4, Pad8 and Pad9 of the capacitive sensors 120 are utilized as the mutual-capacitance transmitter Tx.

Based on the arrangement shown in FIG. 21, the group Pad8 of the capacitive sensors 120 and the group Pad9 of the capacitive sensors 120 located at borders of the touch panel 110*n* can function as the mutual-capacitance transmitter Tx. The groups Pad8 and Pad9 will block or reduce an environmental electromagnetic interference from the left side or the right side relative to the touch panel 110*n*. It will increase a preciseness of the three-dimensional gesture sensing (by eliminate the environmental electromagnetic interference), especially for sensing the three-dimensional gesture event GE above a top surface of the touch panel 110*n*.

It is noticed that, the proximity sensing period P2 shown in embodiments of FIG. 3B and the three-dimensional gesture sensing period P3 shown in embodiments of FIG. 15B or FIG. 18 can co-exist on the interface device 100. In other words, the interface device 100 may include the display driving period P0, the touch sensing period P1, the proximity sensing period P2 and also the three-dimensional gesture sensing period P3 sequentially. The controller 140 will assign the capacitive sensors 120 to perform different functions in different periods, such that all these functions (touch sensing, proximity sensing and/or three-dimensional gesture sensing) can be integrated and executed based on the capacitive sensors 120. The interface device 100 is able to perform all these function without implementing an extra sensor (e.g., an optical proximity sensor, or an optical gesture capturing camera).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for a controller in an interface device, the interface device having a plurality of capacitive sensors arranged on a plane, the control method comprising:

during a first period, setting the plurality of capacitive sensors as a plurality of self-capacitance sensors individually by the controller; and during a second period, dividing the plurality of capacitive sensors into at least a first group and a second group by the controller, wherein the first group of capacitive sensors are applied with a pulse signal and the second group of capacitive sensors are biased at a direct current voltage by the controller, wherein a first area covered by the first group of capacitive sensors is larger than a second area covered by the second group of capacitive sensors.

2. The control method of claim 1, further comprising:

during the first period, detecting a touched position of a touch event by the controller according to the self-capacitance sensors; and during the second period, collecting a sensing signal from the second group of capacitive sensors in response to the pulse signal, and detecting a proximity event by the controller according to the sensing signal generated by the second group of capacitive sensors.

3. The control method of claim 1, wherein during the second period, the plurality of capacitive sensors are divided by the controller into the first group, the second group and a third group, the control method further comprises:

generating a fixed voltage signal by the controller to the third group of capacitive sensors or keeping the third group of capacitive sensors at a floating voltage level by the controller.

4. The control method of claim 3, wherein the third group of capacitive sensors is located between the first group of capacitive sensors and the second group of capacitive sensors.

5. The control method of claim 1, wherein the plurality of capacitive sensors are arranged in rows and columns on the plane, the second group of capacitive sensors are arranged on a stripe region on the plane, the stripe region comprises a first row or a first column on the plane, the first group of capacitive sensors are arranged outside the stripe region on the plane.

6. The control method of claim 5, further comprising:

utilizing the second group of capacitive sensors on the stripe region as a mutual-capacitance receiver;

in response to the pulse signal, detecting one capacitance variance between the first group of capacitive sensors and the second group of capacitive sensors according to a sensing signal generated by the mutual-capacitance receiver; and detecting an occurrence of a proximity event by the controller in response to the one capacitance variance exceeding a threshold value.

7. The control method of claim 5, further comprising:

dividing the second group of capacitive sensors by the controller into K sub-groups, wherein the K sub-groups of capacitive sensors are utilized as mutual-capacitance receivers for generating K sensing signals for detecting K capacitance variances between the first group of capacitive sensors and the K sub-groups of capacitive sensors; and detecting an occurrence of a proximity event by the controller in response to at least one of the K capacitance variances exceeding a threshold value, K is a positive integer greater than 1.

8. The control method of claim 1, wherein the plurality of capacitive sensors are arranged in rows and columns on the plane, the second group of capacitive sensors are arranged on two stripe regions on the plane, and the first group of capacitive sensors are arranged outside the two stripe regions, wherein the two stripe regions comprise a first row and a second row on the plane, or a first column and a second column on the plane.

9. The control method of claim 8, further comprising:
utilizing the second group of capacitive sensors on the two stripe regions as two mutual-capacitance receivers;
in response to the pulse signal, detecting two capacitance variances between the first group of capacitive sensors and the second group of capacitive sensors on the two stripe regions according to two sensing signals generated by the two mutual-capacitance receivers; and
detecting an occurrence of a proximity event by the controller in response to both of the two capacitance variances exceeding a threshold value.

10. A control method, suitable for a controller in an interface device, the interface device having a plurality of capacitive sensors arranged on a plane, the control method comprising:

during a first period, setting the plurality of capacitive sensors as a plurality of self-capacitance sensors individually by the controller; and during a second period, dividing the plurality of capacitive sensors into a plurality of groups by the controller, setting a first combination and a second combination among the plurality of groups of capacitive sensors, wherein the first combination of capacitive sensors are applied with a pulse signal and the second combination of capacitive sensors are biased at a direct current voltage by the controller, collecting a plurality of sensing signals from the second combination of capacitive sensors, and detecting a three-dimensional gesture by the controller according to the plurality of sensing signals, wherein a first area covered by the first combination of capacitive sensors is larger than a second area covered by the second combination of capacitive sensors.

11. The control method of claim 10, further comprising:
during the first period, detecting a touched position of a touch event by the controller according to the self-capacitance sensors; and
during the second period, detecting the three-dimensional gesture by the controller according to the plurality of sensing signals generated by the second combination of capacitive sensors.

12. The control method of claim 10, further comprising:
dividing the plurality of capacitive sensors into a plurality of left groups, a middle group and a plurality of right groups by the controller, wherein the plurality of left groups are located along a left edge of the plane, the plurality of right groups are located along a right edge of the plane, the middle group is located around a center of the plane between the plurality of left groups and the plurality of right groups.

13. The control method of claim 12, wherein during the second period, the first combination comprises the middle group and the second combination comprises the plurality of left groups and the plurality of right groups, the control method comprises:
generating the pulse signal by the controller to the first combination of capacitive sensors formed by the middle group; and collecting the plurality of sensing signals by the controller from the second combination of capacitive sensors formed by the plurality of left groups and the plurality of right groups.

14. The control method of claim 12, wherein,
during a first part of the second period, the first combination comprises the middle group and the plurality of right groups, and the second combination comprises the plurality of left groups, the control method comprises generating the pulse signal by the controller to the first combination formed by the middle group and the plurality of right groups, and collecting a plurality of first sensing signals by the controller from the second combination formed by the plurality of left groups,
during a second part of the second period, the first combination comprises the middle group and the plurality of left groups, and the second combination comprises the plurality of right groups, the control method comprises generating the pulse signal by the controller to the first combination formed by the middle group and the plurality of left groups, and collecting a plurality of second sensing signals by the controller from the second combination formed by the plurality of right groups,
wherein the controller detects the three-dimensional gesture according to the plurality of first sensing signals and the plurality of second sensing signals.

15. The control method of claim 12, further comprising:
during the second period, dividing the plurality of capacitive sensors further into the plurality of left groups, the middle group, the plurality of right groups and a dummy group by the controller, and generating a fixed voltage signal by the controller to the dummy group of capacitive sensors or keeping the dummy group of capacitive sensors at a floating voltage level.

16. The control method of claim 10, further comprising:
during the second period, dividing the plurality of capacitive sensors into a first group, a second group, a third group, a fourth group, a fifth group, a sixth group and a seventh group by the controller, wherein the first group is located around a left-top corner of the plane, the third group is located around a left-bottom corner of the plane, the second group is located around a left edge of the plane between the first group and the third group, the fifth group is located around a right-top corner of the plane, the seventh group is located around a right-bottom corner of the plane, the sixth group is located around a right edge of the plane between the fifth group and the seventh group.

17. The control method of claim 16, further comprising:
during the second period, dividing the plurality of capacitive sensors further into the first group to the seventh group, an eighth group and a ninth group by the controller, wherein the eighth group is located between the left edge of the plane and the first group to the third group, the ninth group is located between the right edge of the plane and the fifth group to the seventh group.

18. The control method of claim 17, further comprising:
during the second period, transmitting the pulse signal by the controller to the eighth group of capacitive sensors and the ninth group of capacitive sensors.

* * * * *